United States Patent
Scholten et al.

(10) Patent No.: US 7,921,629 B2
(45) Date of Patent: Apr. 12, 2011

(54) METHOD FOR IMPROVING THE TRANSPORT OF MULTIAXIAL CONTEXTURE DURING PRODUCTION

(75) Inventors: Friedhelm Scholten, Dulsburg (DE); Klaus Szukat, Parcent (ES)

(73) Assignee: MD Fibertech Corporation, Sausalito, CA (US)

( * ) Notice: Subject to any disclaimer, the term of this patent is extended or adjusted under 35 U.S.C. 154(b) by 106 days.

(21) Appl. No.: 12/364,597

(22) Filed: Feb. 3, 2009

(65) Prior Publication Data

US 2009/0242685 A1 Oct. 1, 2009

Related U.S. Application Data

(63) Continuation of application No. PCT/DE2007/001379, filed on Aug. 3, 2007.

(30) Foreign Application Priority Data

| | | |
|---|---|---|
| Aug. 4, 2006 | (DE) | 10 2006 036 866 |
| Sep. 5, 2006 | (DE) | 10 2006 042 047 |
| Dec. 5, 2006 | (DE) | 10 2006 057 633 |
| Dec. 5, 2006 | (DE) | 10 2006 057 634 |
| Dec. 5, 2006 | (DE) | 10 2006 057 635 |
| Dec. 5, 2006 | (DE) | 10 2006 057 636 |
| Feb. 14, 2007 | (DE) | 10 2007 007 919 |

(51) Int. Cl.
 *D02G 3/00* (2006.01)

(52) U.S. Cl. .................................. 57/6; 57/13
(58) Field of Classification Search ............. 57/3, 6, 57/10, 11, 12, 13
See application file for complete search history.

(56) References Cited

U.S. PATENT DOCUMENTS

| | | | | |
|---|---|---|---|---|
| 3,580,447 | A * | 5/1971 | Kusters et al. | 242/364.2 |
| 3,677,628 | A * | 7/1972 | Walker | 352/128 |
| 5,315,813 | A * | 5/1994 | Ito et al. | 57/6 |
| 5,765,357 | A * | 6/1998 | Burgess et al. | 57/311 |
| 6,684,617 | B2 * | 2/2004 | Longaygue et al. | 57/6 |
| 7,300,014 | B2 * | 11/2007 | Allen | 242/439.5 |
| 2003/0148082 | A1 | 8/2003 | Bompard | |
| 2006/0175454 | A1 * | 8/2006 | Allen | 242/439.5 |

FOREIGN PATENT DOCUMENTS

| | | |
|---|---|---|
| DE | 20050000115 A1 | 3/2006 |
| JP | 20030221771 A | 8/2003 |
| WO | 2005033393 A1 | 4/2005 |

* cited by examiner

*Primary Examiner* — Shaun R Hurley
(74) *Attorney, Agent, or Firm* — Von Rohrscheidt Patents

(57) ABSTRACT

A method for producing a multiaxial contexture, from fiber materials, winds mono-axial contexture from at least one storage device about a winding plane, wherein the winding plane and the at least one storage device rotate about one another, in order to wind the mono-axial contexture about the winding plane. In order to prevent twisting the mono-axial contextures and to facilitate pulling it off from the winding plane, a vibration drive is proposed, which imparts mechanical vibrations onto the winding plane.

15 Claims, 12 Drawing Sheets

FIG. 5.1
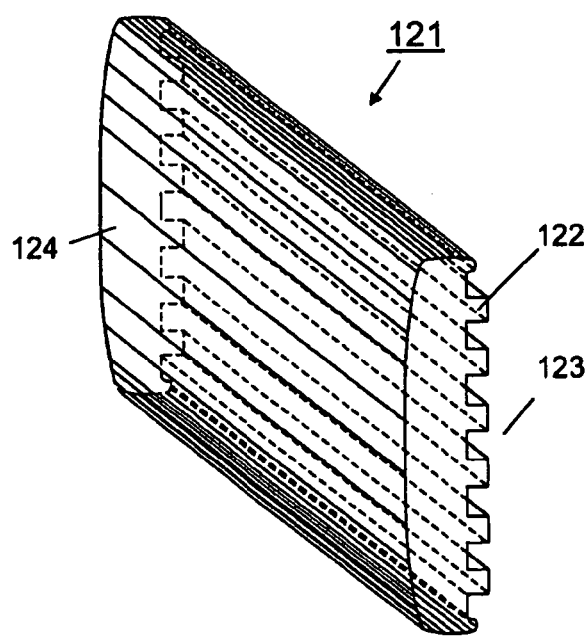
FIG. 5.2
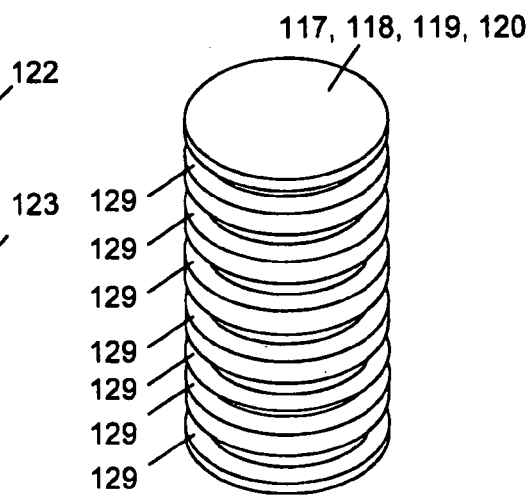
FIG. 6
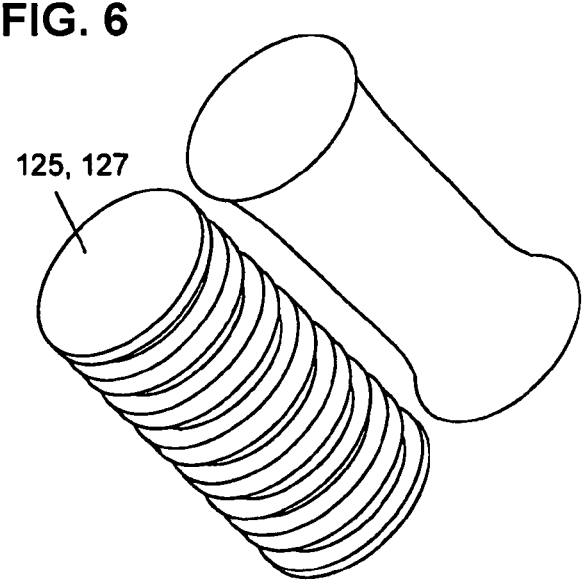

131  132  133  134  135

METHOD FOR IMPROVING THE TRANSPORT OF MULTIAXIAL CONTEXTURE DURING PRODUCTION

CROSS-REFERENCE TO RELATED APPLICATIONS

This application is a continuation of International Application No. PCT/DE2007/001379, filed Aug. 3, 2007, which claims priority to German Patent Application No. 10 2007 007 919.4, filed Feb. 14, 2007, 10 2006 057 636.5, filed Dec. 5, 2006, 10 2006 057 635.7, filed Dec. 5, 2006, 10 2006 057 634.9, filed Dec. 5, 2006, 10 2006 057 633.0, filed Dec. 5, 2006, 10 2006 042 047.0, filed Sep. 5, 2006, and 10 2006 036 866.5, filed Aug. 4, 2006.

BACKGROUND

The invention relates to a method for the continuous production of a multiaxial contexture web, in which a contexture is shaped to form a multiaxial contexture by winding about a plane and it relates to a corresponding apparatus for carrying out the method.

Long fiber reinforced composite components constitute an important application for technical textiles. The configuration and structure of the reinforcement textile substantially determine the properties of the final composite component in combination with the fabrication technology and the matrix material used. Multiaxial contexture webs, also designated as MD- or multidirectional contexture webs, thus play an important role, since compared to other textiles, they facilitate area layouts, which provide a better utilization of the specific properties of the fibers employed, while simultaneously reducing the production cost and thus component cost.

In order to produce multiaxial contexture webs, various techniques are employed. It is obvious to resort to a technology which is similar to weaving, wherein a weft thread is placed at an angle to the direction of extension of the contexture web. This method, however, is slow and only allows a slow production speed when the fibers are fine. A method has proven to allow much faster production, in which uniaxial contexture webs, also designated as UD- or unidirectional contexture webs are formed into multiaxial contexture webs through winding about plane.

In the published patent application DE 10 2005 000 115 A1, a method for producing a multidirectional contexture web is disclosed, in which a contexture, whose fibers are oriented in the running direction of the contexture web, is circumwound by two additional webs at an angle relative to the running direction, which creates a multiaxial contexture. Said multiaxial contexture thus comprises at least three layers. These are the two opposite layers of the contexture wound at an angle and the so-called zero-degree-web, which comprises fibers in running direction of the contexture web. Such a web has positive features with reference to tensile strength.

The Japanese patent application JP 2003 221771A relates to a method for producing a multiaxial contexture web, in which only the contexture webs, which are wound at an angle, are wound about two approximately hand wide bands, which remain in the contexture. This method creates a multiaxial contexture, which comprises reinforced edges. The reinforced edges, on the one hand, have the advantage that the contexture comprises high toughness or high stability, in particular, at the edges, on the other hand, said contexture has the disadvantage that it cannot be wound up on a roll in a stable manner, due to the increased thickness of the material at the edges, and, on the other hand, it is not hereby not possible to establish layers of constant thickness of a fiber reinforced plastic, since the lateral bands increase the thickness of the contexture unnecessarily.

SUMMARY OF THE INVENTION

Thus, it is the object of the invention to provide a method for producing a multiaxial contexture, which overcomes the disadvantages of the prior art.

The object of the invention is accomplished by using tension elements as a delimitation of the plane, about which the unidirectional contexture is wound, wherein the tension elements can be removed or separated after winding the contexture web thus produced. Other advantageous embodiments of the invention can be derived from the dependent claims.

Compared to the method disclosed in JP 2003 221771A, a pair of tension proof tension elements is used according to the invention, which are used as a winding plane for the contexture webs, disposed at a slant angle relative to the running direction of the contexture. This creates a multiaxial contexture web, which initially only loosely adheres to itself internally and which is pulled through two calendering rollers after windup. Corresponding indentations are provided in the calendering rollers, in which the tension elements run, so that the distance of the calendering rollers can be selected independently from the tension elements. The calender joins the contexture webs firm enough, so that they form a firm multiaxial contexture, possibly using binder- or glue means. Additionally, there is the possibility to use an impregnation method or a fixation method upon the contexture together with the tension elements or without the tension elements, so that the contexture can be wound up for further processing and becomes much easier to handle. Directly after the calendering or impregnation, the multiaxial contexture web can be separated from the tension elements by an edge side cut. In this cut, the removed tension elements are either wound onto an additional drum, wherein fibers, which adhere to the tension elements, can be optionally removed from the tension elements before they are wound up, but it is also possible to feed the tension elements back into the process instead of winding them up, so that the tension elements are run in a continuous loop. Furthermore, it is possible to windup the tension elements, and after the contexture webs, from which the multiaxial contexture is produced, have been unwound, the wound up tension elements can be fed back into the process by feeding them back into the production process on an unwinding roll. Furthermore, there is the possibility to pull the tension elements out of the contexture during further processing, instead of cutting them off, as long as it is assured that the contexture does not adhere to the tension elements.

The unidirectional contexture is provided to the winding plane transversal to its running direction, wherein e.g. an angle of 45° can be enclosed between the running direction and the feed direction. Depending on the requirements, however, also other angles between 0° and 90° degrees can be enclosed. Furthermore, it can be useful to provide a third web of a uniaxial contexture, which is positioned e.g. between the transversally fed uniaxial contextures. This three layer multiaxial contexture thus produced is suitable in particular to absorb tensile stress in longitudinal direction of the multiaxial contexture, which can occur e.g. by pulling the multiaxial contexture off from the winding plane. This additional third layer can be comprised of the same material as the uniaxial contextures, supplied at a slant angle, or it can be comprised of another suitable material. Thus, e.g. a third layer can be supplied as a gluing grid or as an adhesion grid, by which abutting layers of uniaxial contexture can be glued to one another.

It is furthermore advantageous, when the indentations in the enveloping surface of the calender rollers are configured, so that tension forces occurring in longitudinal direction in the multiaxial contextures only occur in the portion of the indentations, this means in the portion of the tension elements disposed in the multiaxial contexture, and the remaining portion of the multiaxial contexture, which is centrally located between the tension elements, remains substantially free of tension. This configuration facilitates the production of a high quality multiaxial contexture in a simple manner.

It is furthermore suggested to treat the multiaxial contexture after calendering with a spiked roller or with a needle bar, this means it is provided with holes, which are configured so that the resin, employed for a possible subsequent drenching of the multiaxial contexture, penetrates well into the multiaxial contexture, in order to provide a material of consistent high quality. The holes thus imparted into the multiaxial contexture can be imparted into the multiaxial contexture with various patterns.

In order to perform the methods, there are two different variants in principle. In a first variant, two rollers are used in the process, which store unidirectional fiber material contextures. Said rollers are disposed on a fixed axis. The rollers from which the unidirectional contexture is taken off are thus disposed opposite to one another, and an assembly is installed between the rollers, in which the two tension elements, which are used as a delineation of the winding plane for the unidirectional contexture, are unwound and run through two calendering rollers. Thus, the tension elements can be removed before the calendering, wherein the calendering rollers provide the necessary mechanical tension to the contexture. Alternatively, the tension elements can be removed after the calendering. The two tension elements are then rotated about an axis, which is disposed central parallel with respect to the two tension elements, and thus wind the uniaxial contexture off from the rollers, which provide the uniaxial contexture, and wind it about the plane, which is defined by the two tension elements. One pair of calendering rollers rotates together with the plane, which rotates together with the two tension elements, and devices, which also co-rotate, are disposed proximal to the calendering rollers, which remove the tension elements from the edge of the multiaxial contexture before or after calendering, e.g. by a cut. Thus, the tension elements are wound up in parallel to the multiaxial contexture or they are fed back into the process. Cleaning the cutoff tension elements from residual fiber or binder rests is an optional step. Since laterally open fibers are created by the cut in the multiaxial contexture, it has proven advantageous when the lateral edges of the multiaxial contexture are also purled by a respective device, so that the contexture does not tend to fray at its sides, which would render the multiaxial contexture more difficult to work with.

In a second embodiment of the method according to the invention it is also possible that the entire device, in which the tension elements are wound off and wound up again, the calendering roller pairs and the cutting- and purling device are held stationary, while the two rollers with the unidirectional contexture are wound about the plane of the tension elements.

In both embodiments, there is a relative movement of the plane, which is defined by the tension elements, relative to the material with the uniaxial contexture, which is stored on the rollers and wound onto the plane.

In order to stabilize the winding process, it is provided that the tension elements are scored in a preferred embodiment of the method according to the invention, or that the tension elements are provided with a binder- or glue means. Scoring the tension elements or the binder or the glue coating of the tension elements makes the tension elements grip the contextures more safely, from which the multiaxial contexture is fabricated, which causes the contexture thus created to be formed more evenly, and causes the unwound unidirectional contexture not to tend to slide during the calendering process and during the subsequent separation process. Thus, a contexture can also be used in another embodiment of the method according to the invention, which contexture comprises a small amount of binder, so that the uniaxial contextures wound into one another adhere to one another, which provides a more stable contexture web. Thus, it is also possible that a so-called prepreg is used as a base material, in which the fibers are already provided with a binder that has not hardened yet, or with non-polymerized glue, which can be hardened optionally in an optional subsequent process. Additionally, it is also possible to use an adhesion thread grid for stabilizing the contexture webs, wherein said contexture web is wound off and guided between the tension elements and connects the webs with one another.

A multiaxial contexture web thus produced can be made of various fiber materials. It is possible to use bound textiles as a base material for the multiaxial contexture web. Cloths can be used, knitted materials, but also fleeces or single fibers in unidirectional or multidirectional patterns, rovings, threads or fiber layers.

The material, from which the fibers are made, can be glass-, carbon- or aramid fibers, alternatively, natural fibers like flax, jute, or sisal can be used, but it also possible to use plastic fibers like polypropylene, PBO, polyester or polyethylene.

The tension elements employed can be made of wires or bands, which may be made of metal. Alternatively, there is the possibility to use plastic material, wherein preferably the contexture material is used, so that furthermore there is the possibility to feed the finished contexture together with the tension elements to the subsequent production process. In this case, the tension elements certainly do not have to be separated from the contexture.

In order to perform the method, a device is provided, which provides at least one winding roll for fiber material, a calendering unit and possibly a separation unit and rolls for winding up and unwinding the tension elements, wherein the tension elements are pulled off in parallel from rollers and thus are held in a plane, which defines the plane for circumwinding the contexture. Additionally, this device can be combined with a separation unit, so that the tension elements can already be removed shortly after the winding process. Alternatively, there is the possibility that the contexture is run through an impregnating unit together with the tension elements, so that a flexible, but internally stable contexture is provided after hardening. After the impregnating unit, at the latest, the tension elements can be removed, or in case they are made of contexture material themselves, they can remain in the contexture.

The invention furthermore relates to a method for producing of a multiaxial contexture, preferably made of carbon fibers, in which a monoaxial contexture from at least one storage device is wound about a winding plane, wherein the winding plane and the at least one storage device rotate about one another, in order to wind the monoaxial contexture about the winding plane, and the invention relates to a corresponding device for performing the method according to the invention.

In order to produce fiber reinforced plastics, contextures made of fibers are used, which are transfused by a plastic material. The compound made of plastic and fibers provides high stability with respect to tension to the fiber reinforced plastic, wherein the tension stability depends on the orientation of the fibers provided in the contexture. Fiber reinforced plastics are primarily used where a high load bearing capability is required in combination with low weight, like e.g. in aircraft or naval construction. In order to provide fiber reinforced plastics with minimum weight, it is necessary to keep the amount of plastic material applied to the fibers as low as possible, wherein the plastic material should completely encapsulate the fibers. When using woven fibers, the fiber layer becomes relatively thick compared to the thickness of the fibers and thus requires more plastic material, which leads to a fiber reinforced plastic component with an increased layer thickness, and thus high weight. In practical applications, contextures of fiber materials are used increasingly, in which the particular fibers are uniformly disposed and do not cross over one another, in order to keep an increase of the layer thickness of the fiber material, and thus the plastic material requirement of the fiber material as low as possible. Since it is known that the plastic material only has high tensile strength in the direction of the fibers, multiaxial contextures are used, in which the fibers are laid in plural planes, wherein the fibers comprise a preferred direction in each plane and preferably do not cross over one another. The simplest multiaxial contexture thus produced is a contexture in which two webs of a fiber arrangement are placed over one another, so they cross over one another. Such contextures are produced either by placing single portions of a contexture web adjacent to one another at an angle to the web, wherein initially a lower layer and subsequently an upper layer is assembled from particular portions. Herein, particular diamond shaped portions are assembled into long webs. This method, however, is not suitable to economically produce larger quantities, like they are necessary for industrial production processes.

Another method thus resorts to winding one or two webs about a plate at an angle, and to pull the coil thus created off from a plate. This process can be performed continuously, wherein the coil is pulled off from the plate, and subsequently compressed to form a contexture. Such a method has proven difficult to implement in practical applications, in particular, when the fibers almost have fluid properties, like it is the case for carbon fibers. This means that the fibers, due to their low weight and low surface friction easily fall over one another, and thus counteract the forming of a uniform contexture web. The more fluid the behavior of a contexture becomes, the more difficult is the production of a uniformly shaped multiaxial contexture. When winding about the plate, it is necessary that the contexture, which lies at the bottom and on the plate, does not tend during continuous pull off from the plate that the particular fibers roll off from the plate, thus having a twist which leads to the fibers curling or crossing over one another after the contexture is pulled off. The crossover renders the contexture qualitatively inferior to unusable compared to a continuously formed multiaxial contexture, which does not comprise any crossovers. The rollover of the fibers occurs in particular when the contexture is wound onto the winding plate under comparatively high tension. However, when the contexture is loosely placed about the plate, the particular fibers are able to cross over one another or to form loops, when they slide off the plate. This also leads to a result with inferior quality or unusable quality.

It is the object of the invention to provide a device and a method, in which a monoaxial contexture is formed into a multiaxial contexture through winding about a plate, wherein friction when pulling the coil from the plate shall be avoided as far as possible in order to obtain an evenly formed multiaxial contexture.

The object according to the invention is accomplished by using at least one belt- or band drive at the opposite sides of the winding plane. Other advantageous embodiments of the invention can be derived from the dependent claims.

The winding plane, about which a monoaxial contexture is wound, comprises a thickness, so that a belt- or band drive can be housed within the plate, which is used as a winding plane. Though the thickness of the winding plane increases substantially, so that the coil is formed into a hose, when it is pulled off the winding plane, which hose has to be shaped into a contexture in a subsequent step, but the dimensions of the belt- or band drive at opposite sides of the winding plane facilitate housing a mechanism, which facilitates a completely friction free pulling of the coil from the winding plane. The fibers do not slide on a surface and do not roll off from said surface either, but the belt- or band drive continuously transports the coil forward and thus releases the coil at the end of the winding plane. Contrary to a low friction configuration of a winding plane e.g. by coating it with a surface, which comprises low friction resistance, it is provided here that the winding plane is preferably formed by at least one band drive.

It is provided in an advantageous embodiment of the present invention that a cross over guide for the belt or band is provided in the method and in the corresponding device, wherein the belt or the band is freely guided at opposite sides of the winding plane. It is accomplished by a cross over guide of the belt or of the band that the driving at opposite sides of the winding plane is completely uniform. This allows doing away with a synchronization assembly of two drives which leads to a simplified configuration of a mechanism according to the present invention. Thus, it is very important for the driving at opposite sides of the winding plane that the winding plane comprises the same velocity at any given point in time so that a twisting of the particular fibers is avoided through a synchronous movement of both sides. Through the cross over guide of a belt or of a broad band it is accomplished that the belt or the band lays flat in the center between the two outer edges or winding surfaces, wherein the distance at both outer edges of the belt or of the band has the same length in the cross over guide. Through a cross over guide of the belt or the band it is assured that the belt or the band neither has to expand nor contract, which facilitates the use of a belt or a band which is also inflexible in driving direction.

Such a belt or a band can be highly taunted and facilitates a rigid configuration of the device according to the invention.

In order for the sensitive fibers not to touch moving parts when they are folded into a multiaxial contexture, it is provided that a minimal protrusion of the belt or of the band beyond the drive- and guide rollers is provided at the corner of the winding plate. In the method according to the invention and in the device according to the invention four vertically disposed drive- and/or guide rollers are provided at the corners of the plate provided as a winding plane. These are bracketed approximately in the center by means of an axle in a bearing. The protrusion of the belt or of the band beyond the width of the drive and/or guide rollers has the effect that the fibers which are taunted over the belt or over the band are transported over the bracketing and the bearing without the fibers coming into contact with said moveable parts. The amount of the protrusion thus has to be selected, so that a mechanism which may be present for bracketing the drive- and/or guide rollers is disposed within the height of the protrusion. Through the cross over guide of the belt or of the band it is accomplished that the belt or the band, due to the rotation, requires less height but more width in the center of the winding plate relative to the dimensions at the sides. To reduce the height hereby is an essential prerequisite for guiding the very sensitive fibers, so that they do not come into contact with movable components or with components, whose velocity is different than the driving velocity.

In an advantageous embodiment of the invention it is provided that a profile belt or a profile band is used, which comprises at least one profile ridge towards the drive side of the profile belt or of the profile band. Through the at least one profile ridge on the drive side of a profile belt or of the profile band it is accomplished that the belt or the band can be guided about the drive- or guide rollers, wherein forces can possibly be created at the rollers through the rotation which cause the belt or the band to slip off the drive- or the guide rollers. These forces can occur when the profile rollers are not absolutely parallel to one another and when one respective pair is not aligned so that is lies in a plane. The profile belt or the profile band thereby compensate minor misalignments of the drive- and/or guide rollers.

In a particularly advantageous embodiment of the invention the profile belt or the profile band comprises plural profile ridges facing towards the drive site, so that the belt or the band can be highly tautened without thereby letting the lateral shear forces at the profile ridge become high enough due to the high tension, so that a premature wear of the belt or of the band occurs. When profile belts or profile bands are used, the drive- and/or guide rollers have a negative shape which corresponds to the profile belts or to the profile bands, so that the drive and/or guide rollers safely receive the longitudinal profiles of the belt or of the band, thereby guiding the belt or the band.

In another advantageous embodiment to the invention the profile belt or the profile band comprises an additional teething, so that the belt or the band can be driven by the teething safely and without slippage.

In order for the winding plane and the storage device for a monoaxial contexture to be able to rotate about one another, it is furthermore provided in an advantageous embodiment of the invention that the belt or the band comprises a profiling with profile grooves extending transversal to the running direction of the belt or of the band. These profile grooves comprise a width which corresponds to the dimension of the width of a fiber. Hereby it is assured that the fibers wound onto the winding plate come to rest in the fine profile grooves on the outside of the belt or of the band and do not tend to cross over one another or twist due to slightly asynchronous movements of winding plate and the storage device, since the fine profile grooves keep the fibers in place.

It is provided in the method according to the invention that tension rollers are used, which are aligned perpendicular to the drive- and/or guide rollers which are disposed transversal to the orientation of the belt or of the band. These tension rollers are preferably disposed in the center or proximal to the center of the winding plane, where the belt portions cross over one another flat. Through the tension rollers it is prevented that the belt portions can touch one another due to oscillations, thus leading to a premature wear and abrasion. Thus, it is provided that the tension rollers do not only influence the path of the roller or of the band in the interior of the volume of the winding plane, but it is also provided that the tension rollers tighten the belt or the band, so that the belt or the band does not tend to contract in the middle during winding, wherein the fibers have a smaller diameter when being wound around the winding plane, than necessary to slide over the two drive- or guide rollers, and they could thus tear when being pulled off from the winding plane.

For improved tightening capabilities of the belt or of the band it is provided that the belt or the band comprise a steel belt, which makes the belt or the band particularly inflexible in driving direction. Hereby the belt or the band can be tightened very hard, so that the belt or the band do not tend to contract in the middle when carbon fibers are wound around them, as long as the tension of the fibers is not so high that the elasticity of the steel belt causes the belt or the band to contract in the middle between the two drive- and/or guide rollers. Thus it is not absolutely mandatory that the belt or the band comprises a steel belt, but it is also possible that a textile reinforced belt or band is used, wherein besides natural fibers also carbon fibers Kevlar®-fibers can be used.

In another embodiment of the method according to the invention a convex surface at the upper side and at the lower side of the winding plane is provided, which covers the belt- or band drive in the interior of the winding plane. Thus, it is also possible to do without a cross over guide of the belt or of the band. It is also possible to dispose the convex surfaces at the sides and to provide the upper and the lower surfaces of the winding plane with moving bands, so that the larger surfaces transport the multiaxial contexture without friction and the side surfaces transport it with low friction.

The invention relates to a method for the production of a multiaxial contexture made of fibers, in particular, carbon fibers, in which a unidirectional contexture web is wound about a plate at an angle to form a coil, wherein the plate is provided with a device for compensating friction and the coil is pulled off from the plate.

It is the object of the present invention to provide a method which facilitates to pull the fiber coil off from a plate, so that a uniformly shaped multiaxial contexture with two planes is provided.

The object according to the invention is accomplished by using a cascade guide, which is disposed at the end of the plate and which comprises a laterally protruding wedge. Additional advantageous embodiments of the invention can be derived from the dependent claims.

The cascade guide according to the invention comprises a wedge at the end of the plate as its main component, which transforms the hose shaped coil at the end of the plate, about which a monoaxial contexture is wound, into a flat folded web, comprising two planes. The wedge thus comprises a particular geometry, which causes the coil to be transformed into the multiaxial contexture smoothly and without forming distortions at the edges of the contexture web. The base area of the wedge thus comprises an identical geometry relative to the cross sectional area of the plate and it is disposed directly at the plate. Depending on the provision of an assembly to reduce the friction on the plate, however, a gap is provided to run possibly moving portions by the wedge below the wedge. The two main sides of the plate facing away from one another, thus the upper and the lower sides of the plate, are extended by the wedge in a trapeze shape. On the other hand, the sides of the plate with finite thickness are joined by the wedge to form a triangular shape, wherein the base of the triangle has the same width as the thickness of the plate and the triangles laterally guide the contexture beyond the width of the plate. The trapeze, which is disposed at the upper- or lower side of the plate, comprises a base, which corresponds to the width of the contexture, wherein the width of the contexture is not quite reached in order not to run the contexture on the wedge under mechanical tension.

In a particularly preferred embodiment of the cascade guide according to the invention, the wedge comprises a lug at its end, thus where the two trapezes join with their bases. The lug has the advantage that the coil, which is almost folded into a flat web, is smoothly pulled off from the wedge.

In another advantageous embodiment of the invention, the wedge comprises a small bead at the lateral points, which seamlessly transitions into a bead at the edges of the lug, in order to reduce the friction resistance at the lateral edges of the lug.

The width of the bases of the two trapezes of the wedge is thus selected, so that it is wider, than the width of the winding plate, exactly by the thickness of the winding plate. Also here, a slight undersize is provided, in order not to let the coil slide off from the wedge under load.

In a particular embodiment of the invention, the wedge in the cascade guide comprises a base area, which is identical to the cross sectional area of the plate, and comprises tetrahedron shaped extensions, which laterally protrude beyond the edges of the plate in the plane of the plate, whereby the two planes of the plate are extended by trapezes of the wedge, which taper into one another, and wherein the width of the base of the two trapezes is increased relative to the width of the plate by the thickness of the plate. The length of the wedge has to be adapted to the flow properties of the coil. The more flow capable the coil, the longer the wedge has to be selected, in order to prevent the minor movements of the particular fibers at the rims of the winding plate during deformation of the coil into a flat contexture, and thus assure the uniformity of the multiaxial contexture webs thus produced with the lowest complexity possible.

In another embodiment of the invention, the cascade guide comprises rollers next to the wedge, in order to guide the coil on the wedge. The configuration of the method according to the invention is thus characterized by using particular rollers in the cascade guide, which are driven at the velocity of the contexture, so that the rollers neither slow down nor drive the contexture and so that they press it onto the wedge. The rollers are advantageously controlled by sensors, so that the rollers neither slow down the contexture, thus upsetting the contexture when pulling the coil off from the plate, nor tear the coil apart by driving it forward. Since the particular contextures are not stable against a distortion of the particular webs in plural directions like a textile material, it is important that in particular the compression rollers press the contexture onto the wedge in an ideal scenario without force with respect to driving the contexture forward or slowing the contexture down in order to prevent that distortions form when the coil is pulled off from the plate and shaped into a contexture.

In an advantageous embodiment of the invention, at least two roller assemblies are used, each comprising rollers disposed on a common axis, wherein different roller assemblies comprise different speeds, adapted to the speed of the unwinding coil. When the coil is formed into a uniform contexture, slightly different directions of movement occur within the web, which comprise directional components, pointing laterally out of the web with respect to the drive direction of the web. These directional components can be configured with different thickness at different locations. Thus, it has proven advantageous not to use a continuous roller in the cascade guide, but to use particular rollers respectively adapted to the local velocity of the web, wherein said rollers are disposed on one axle assembly. This prevents inconsistencies from occurring through an adaptation of the roller velocity to a mean drive velocity of the coil, which could lead to distortions in the multiaxial contexture web. At least two roller assemblies are advantageously used, which are disposed behind one another, and which are added depending on the length of the wedge, so that the coil is uniformly pressed against the wedge over the entire surface of the wedge.

In another advantageous embodiment of the invention, at least two roller assemblies are used in the cascade guide, each comprising rollers disposed on a common axis, wherein different roller assemblies comprise different axis orientations adapted to the flow direction of the pulled off coil. The rollers, which press the coil onto the wedge, are not only exposed to different velocities of the coil when forming the coil into a multiaxial contexture web, but they also experience different flow directions. In the center of the plate, the flow direction is equal to the web direction. At the sides of the wedge, where the vertical side surface of the winding plate tapers into a triangle and where it is run around the edge of the laterally extended wedge, the components of the coil have a slightly different flow direction. This configuration of the invention facilitates that the rollers are adapted according to the flow direction, which is provided by the shape change. This prevents that distortions form in the multiaxial contexture web when the coil is formed into the contexture web.

It has proven advantageous to pull the contexture over a lug at the end of the wedge, which lug is disposed at the end of the wedge and comprises an approximately rectangular shape with very small wall thickness. This provides the ability to the contexture to align on the lug without forming distortions due to the lack of a support frame.

In order to reduce the friction at the edges of the lug, it is provided to configure the edges with a slightly pronounced bead, wherein the bead is configured, so that the fibers can loop around said bead without breaking. Thus, the characteristic of the bead is highly dependent on the bending capability of the fibers used in the contexture. In order to support the flow of the coil during forming, it is provided that the coil is slightly rounded at the edges and that the points of the wedge end in a small bead in order to provide a smooth transition from the wedge into the lug, wherein said bead seamlessly transitions into the lug.

Thus, it has proven advantageous, when the bead is slightly tapered towards the end of the lug. Through the tapered bead, the mechanical winding tension about the lug is slightly reduced during pull off. Alternatively or cumulatively with that, also the geometry of the lug can be slightly trapezoid, so that the lug is tapered relative to the width of the wedge where the formed coil is taken off the lug. Also, this taper facilitates a reduction of the mechanical tensions when pulling off the coil.

In a particularly advantageous embodiment of the invention, the components of the cascade guide are provided with a friction reducing surface. Surfaces made of a polyfluorized polymer have proven particularly advantageous for this application and a surface of diamond type carbon has proven highly advantageous in particular, wherein said carbon material comprises a particularly low friction relative to carbon fibers. This prevents the generation of friction forces, which cause a non-uniform forming, and thus create inconsistencies in the formed coil.

The invention furthermore relates to a method for producing a multiaxial contexture, preferably made from carbon fiber materials, in which a monoaxial contexture is wound from at least one storage device about a winding plane, wherein the winding plane and the at least one storage device rotate about one another in order to wind the monoaxial contexture about the winding plane. The invention also relates to a corresponding device for performing the method.

It is furthermore the object of the invention to provide a method for producing a multiaxial contexture and a device for performing the method, which overcome the disadvantages of the prior art.

The object is accomplished according to the invention by using a vibration drive, which causes the winding plane to vibrate mechanically. Other advantageous embodiments of the invention are derived from the dependent claims.

In the method for producing a multiaxial contexture, a monoaxial contexture is unwound from a storage device, preferably provided as a roller, and wound about a winding plane at an angle. For this purpose, the winding plane and the at least one storage device rotate about one another, so that the monoaxial contexture is wound by the storage device about the winding plane. In order to be able to pull the wound contexture off from the winding plane, it is provided according to the invention to use a vibration drive, which causes the winding plane to vibrate mechanically. The vibrations thus have low amplitude and comparatively high frequency. Thus, it is provided in a preferred embodiment that the vibration parallel to the side edges caused by the oscillations follows a certain profile in the time distance diagram, so that the particular fibers are transported in a preferred direction. It is also possible to perform the vibration in other directions with reference to the side edges of the winding plane. When the mechanical oscillation is performed without preferred direction, then the fiber laid around the winding plane is not in direct contact with the winding plane for long periods of time, since it is pushed away from the winding plane by mechanical oscillations. Within this short period of time it is possible to pull the contexture from the plate with little friction resistance, thus it is irrelevant that not all fibers are simultaneously lifted from the winding plane, since the mean friction is significantly reduced by the vibration. However, when the vibration is performed in parallel to the lateral surfaces of the winding plane, it is possible by a certain type of vibration control to transport the particular fibers of the contexture web in a preferred direction. When the winding table is caused to vibrate with short amplitude and without certain preferred directions, the contexture can be pulled off from the plate with little resistance. However, when the frequency is adapted to the friction of the contexture on the winding plane, so that the fiber is transported by the friction resistance through a slow movement in the pull off plane, and the friction resistance transitions from static friction to dynamic friction through a quick reversal movement, wherein the inertia of the fibers prevents a fast backslide of the fibers on the winding plane, then the contexture is transported in pull off direction. Through the two different velocities of the mechanical oscillations in pull off direction and in reversal direction, a transport of the fibers is accomplished. When oscillating in pull off direction, the winding plane moves slowly forward. During this slow movement, the fiber is under static friction on the surface of the winding plane and is thereby moved forward by the plate. During the quick reversal movement of the winding plane, the fiber transitions from a static friction state into a dynamic friction state, wherein the winding plane moves back below the fiber without the fiber following this reversal movement. This way, the entire contexture is continuously moved forward. It is an advantage of the vibration drive that the contexture is transported along the winding plane instead of the unavoidable friction of the contexture on the winding plane without the particular fibers tending to cross over, which facilitates the production of a uniform contexture.

Thus, it is possible to create a low friction state of the contexture on a winding plane through a non-oriented vibration, and it is possible to create an oriented vibration through an oriented vibration with different velocities in different oscillation directions, which causes the fiber to be transported in a preferred direction. The oriented vibration is suitable for such methods and devices for producing a multiaxial contexture by pulling the multiaxial contexture off from the winding plane. On the other hand, the oriented vibration is suitable for such methods and devices where the multiaxial contexture is not pulled off from the winding plane by an additional device or where it slides off the winding plane due to gravity, but the contexture is driven forward by the vibration.

A vibration drive is advantageously used by the method according to the invention, which generates mechanical oscillations with substantially saw tooth configuration with respect to the time-distance-diagram. Thus, the steeper flank of the oscillation movement in the time-distance-diagram is oriented against the pull off direction and the less steep flank of the oscillation movement in the time-distance-diagram is oriented in the pull off direction of the contexture. Through this saw tooth type character with reference to the time-distance-diagram, a transport of the fibers on the winding plane is advantageously achieved, so that an additional device for pulling off the contexture can be omitted.

In order to adjust the friction of the fibers on the winding plane, it is possible to impart fine structure onto the winding plane. Through the fine structuring, a defined friction resistance of the fibers on the winding plane can be achieved, so that the oscillation amplitude and the oscillation frequency can thus be adjusted. For example, it is hereby possible to adjust the vibrations to low frequency and low amplitude, which is necessary for a uniform forward movement of the particular fibers. Through the lower amplitude and the lower frequency, a substantially wear reduced configuration of the device for performing the method according to the invention becomes possible, and the device requires less energy in order to make the winding plane oscillate. It is furthermore possible to choose the weight and the elasticity of the winding plane, so that the resonance frequency of the winding plane corresponds exactly to the frequency which is necessary for transporting the fibers on the winding plane. It is up to the discretion of a person skilled in the art to set the correct parameters for the fine structures, the weight, the elasticity, the frequency and the amplitude of the oscillations through experimentation.

In an advantageous embodiment of the invention, the forward drive velocity of the fibers of the contexture on the winding plane is synchronized through the vibration drive with the relative rotation velocity of the storage device about the winding plane. Thus, during the time period of a half relative rotation of the storage devices about the winding plane, the forward driving is performed by the tangent of the winding angle $\alpha$, which is measured between the orientation of the side edges of the winding plane, and the alignment of the fibers of the monoaxial contexture, multiplied by the width of the winding plane. By synchronizing the forward drive velocity with the relative rotation of the storage device about the winding plane, a continuous winding process is implemented, in which the contexture web forms a multiaxial contexture without forming a winding seam.

Since the winding plane has a finite thickness, it may be necessary to vary the drive velocity through the vibration drive during the winding process. During the winding process, the monoaxial fibers are tightened by two different edge types with respect to the rotation. On the one hand, the monoaxial fibers are tightened during a quarter relative turn by an edge, so that the fibers of the monoaxial contexture are laid onto an upper or lower surface of the winding plane, and, on the other hand, the fibers are tightened during a quarter and relative rotation of the monoaxial contexture by an edge, so that the fibers of the monoaxial contexture are laid onto a narrow side edge of the winding plane. In order for the driving to always be synchronized and so that no winding seams form, it is thus necessary to synchronize the driving by the vibration drive with the different tension states of the fibers of the monoaxial contexture. Thus, the vibration drive has to be set faster during winding onto the upper or lower surface, than when the fibers are wound onto the side surfaces of the winding plane. Thus, the drive velocity is varied by the vibration drive during a relative rotation of the at least one storage device about the winding plane. The drive velocity is adapted to the product of the tangent of the winding angle α, which is measured between the orientation of the side edges of the winding plane and the orientation of the fibers of the monoaxial contexture and the width of the winding plane per quarter rotation of the winding plane, when the fibers of the monoaxial contexture are tightened by a side edge of the winding plane and wound onto a surface of the winding plane. On the other hand, the drive velocity is adapted to the product of the tangent of the winding angle, which is measured between the alignment of the orientation of the side edges of the winding plane and the orientation of the fibers of the monoaxial contexture and the thickness of the winding plane per quarter rotation of the winding plane, when the fibers of the monoaxial contexture are tightened by a side edge of the winding plane and wound onto a side edge of the winding plane.

Advantageously, an oscillation frequency of 1 to 500 Hz, preferably 2 to 100 Hz, particularly preferably 3 to 50 Hz, and overall preferably 5 to 50 Hz, is selected for the method according to the invention.

Thus, advantageously an amplitude of the oscillation of 0.001 cm to 10 cm, preferably 0.01 cm to 5 cm, particularly preferably 0.1 cm to 1 cm, and overall preferably 0.2 to 0.5 cm, is selected.

The invention furthermore relates to a method for producing a multiaxial contexture, preferably made of carbon fiber materials, in which a monoaxial contexture from at least one storage device is wound about a winding plane, wherein the winding plane and the at least one storage device rotate about one another, in order to wind the monoaxial contexture about the winding plane, and the invention relates to a corresponding device for performing the method according to the invention.

It is furthermore the object of the invention to provide a method and a device which facilitate to pull the fiber coil off from a plate, so that an evenly formed multiaxial contexture is made of two planes, wherein the pull off should not lead to distortions or twisting of the particular fibers of a monoaxial contexture.

According to the invention, the object is accomplished by placing the longitudinal axis of the winding plane at a slant angle with reference to gravity. The corresponding device for performing the method according to the invention is characterized in that the winding plane is aligned at a slant angle with respect to gravity. Other advantageous embodiments of the method and of the device according to the invention can be derived from the dependent claims.

By putting the longitudinal axis of the winding plane at a slant angle with reference to gravity, it is accomplished that the fibers slide from the winding plane with a fluid behavior and with reduced friction on the surface of the winding plane due to gravity. In the prior art, it was known to pull the coil off from a winding plane, which is disposed horizontal, to rotate the winding plane about a horizontally extending longitudinal axis and to provide the winding plane through a third monoaxial contexture, which comprises a fiber orientation in longitudinal direction of the multiaxial contexture to be produced, wherein this contexture is used with vertical longitudinal axis orientation, thus in the direction of gravity in the device for producing the multiaxial contexture.

Compared to the methods described supra, the method according to the invention has the advantage that the tilting can be adapted to the weight and to the actual friction force of the fibers on the winding plane. Depending on the level of the friction force, the winding plane can be tilted at an angle relative to gravity, so that in an ideal case, a constant dynamic friction is created between the fiber and the winding plane, which leads to a constant sliding of the monoaxial contexture from the winding plane.

In an embodiment of the method according to the invention and in the corresponding device for performing the method, it is provided that the winding plane is held stationary. Thus the stationary held winding plane can be disposed, so that the longitudinal axis of the winding plane is oriented at an angle relative to gravity, wherein the top and the bottom surface of the winding plane can be oriented vertically or horizontally. When the upper and the lower surface of the winding plane are oriented vertically, gravity acts, so that the monoaxial contexture is supported primarily by an upper edge, which is oriented at a slant angle relative to gravity. Thus, the angle of the winding plane is advantageously set, so that the wound fibers point vertically in the direction of gravity. Thus, it is assured, that the fibers align themselves correctly by themselves and always comprise the correct and desired angle in the monoaxial contexture to be produced.

An orientation of the winding plane, which leads to an orientation of the side edges, whose plane stands perpendicular on a plane, which is horizontally oriented in all directions, leads to a winding plane, whose upper and lower surfaces are oriented at a slant angle with respect to gravity. Thus, the monoaxial contexture is wound onto the slanted plane and slides down from said slanted plane in a uniform manner. Also here it is possible to adjust the friction force and the angle of attack of the winding plane to one another through fine structuring of the surface and through adjusting the angle of the winding plane, which is measured at the longitudinal axis with reference to gravity, so that the monoaxial contexture uniformly slides off from the winding plane.

In an alternative embodiment of the method according to the invention and of the device for performing the method corresponding thereto, it is provided, that the plate is not held stationary, but that it rotates around its particular longitudinal axis. Through a rotation about the longitudinal axis of the winding plane, wherein the winding plane is aligned at a slant angle relative to gravity, and the slanted orientation is measured at the longitudinal axis, which forms an angle relative to gravity, it is possible to wind the contexture from the stationary supported storage devices, so that the monoaxial contexture is wound about the rotating winding plane. Thus, it is provided that the angle of the winding plane is selected, so that also here the friction force of the monoaxial contexture on the winding plane and the angle of attack correspond to one another, so that the monoaxial contexture slides off from the winding plane in a uniform manner. At the end of the winding plane, a device is provided, which removes the multiaxial contexture from the winding plane and winds it up.

In an advantageous embodiment of the invention, a winding plane is provided which rotates and which comprises a slanted orientation of the longitudinal axis of the winding plane with respect to gravity, wherein the slanted orientation varies within a rotation period from a minimum angle to a maximum angle. Hereby, varying friction forces are compensated, which are created when the monoaxial contexture once lies flat on the winding plane and once lies flat on the side edge of the winding plane, and in between lies on the upper side and on the bottom side of the winding plane and simultaneously comes to rest on the side edge. With the different orientations of the monoaxial contextures on the winding plane, it is thus possible to adapt the angle of attack to the respective different friction forces through the different orientations of the winding plane. Through the tumbling winding plane, it is furthermore accomplished, that the unwinding process is facilitated and that the monoaxial contexture is tightened by the edges of the winding plane and loosened again. This way, a particularly uniform placement of the monoaxial contexture on the winding plane can be implemented.

In an advantageous manner, a slanted orientation of 5° to 85° in reference to gravity is selected, preferably a slanted orientation of 20° to 70°, and in a particularly preferred manner an angle of 30° to 50°. Surprisingly, it has become apparent, that the contexture slides off the winding plane in this angular interval solely through gravity, thus forming a highly homogenous and uniform multiaxial contexture.

BRIEF DESCRIPTION OF THE DRAWINGS

The invention is subsequently described in more detail with reference to the appended drawing figure:

FIG. 5 shows a detail of a profile belt with associated drive- and guide roller;

FIG. 6 shows a pair of guide rollers;

DETAILED DESCRIPTION OF THE PREFERRED EMBODIMENTS

Figure 1:
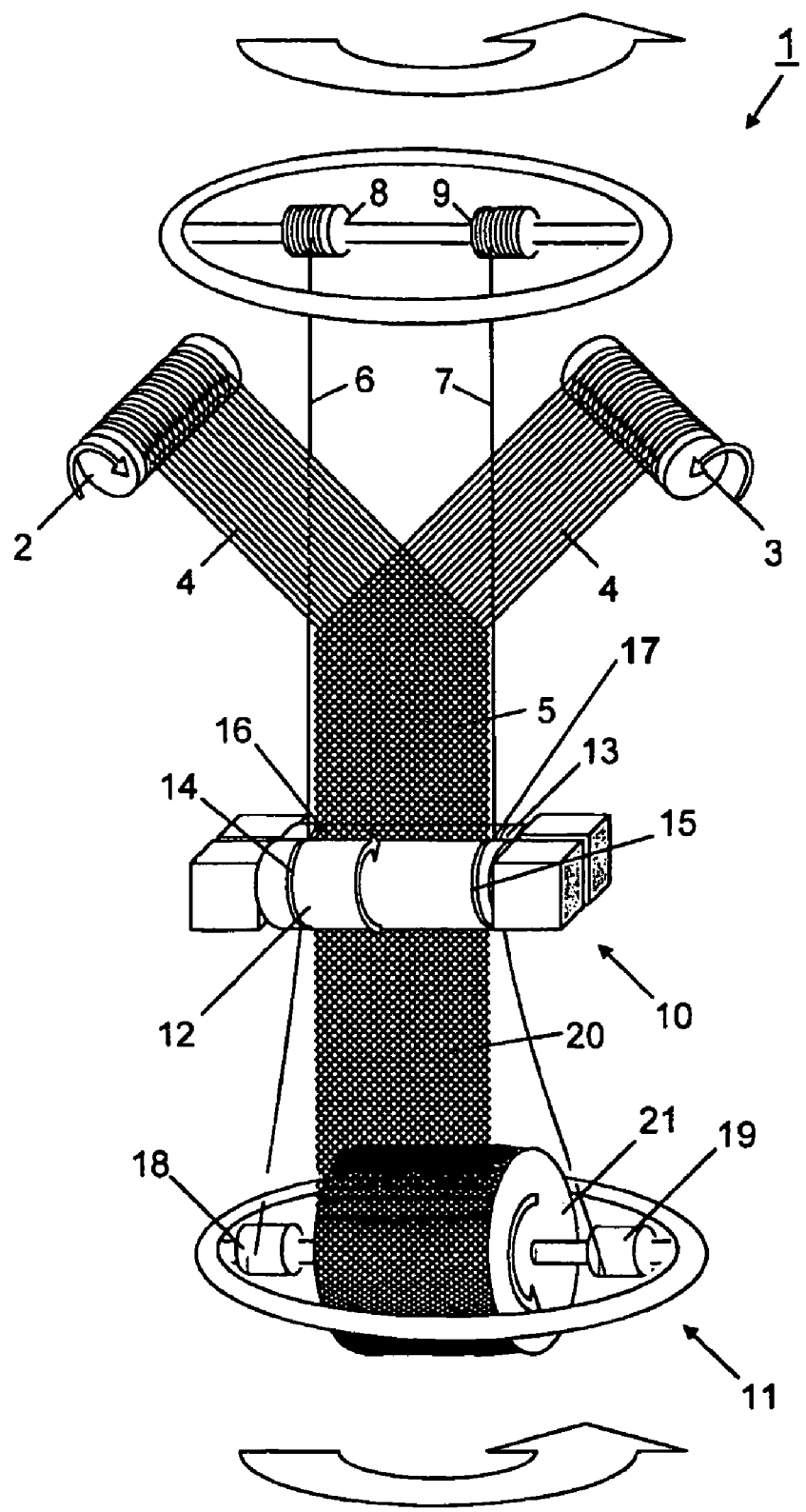
FIG. 1 shows a sketch of the essential elements for performing the method according to the invention.

FIG. 1 shows a winder 1, which can be used for the method for continuous production of a multiaxial contexture web. In the winder 1, two unwinding rollers 2, 3 are disposed from which fiber material 4 is unwound and formed into the multiaxial contexture 5. Thus, the unwinding rollers 2 and 3 are disposed stationary; this means that they do not move in space besides rotating about their particular axes, so that the fiber material 4 can be unwound. In parallel to the extension of the multiaxial contexture 5, two tension elements 6 and 7, which are unwound from the rollers 8 and 9 are tautened and used as a delineation of a plane, which is defined by the two tension elements 6 and 7. Through a synchronous rotation of the rollers 8, 9, of a calendering and separation unit 10, and of the windup unit 11, the tension elements 6 and 7 rotate about an axis, which extends in parallel and in the center of both tension elements 6 and 7.

In the present depiction, the tension element 6 engages the contexture from behind, which contexture is unwound from the unwinding roller 2, and the tension element 7 engages the contexture from the front, which contexture is unwound from the unwinding roller 3. Thus, the contexture is wound about the plane, which is defined by the tension elements 6 and 7. Thus, the fiber material 4 is formed into a multiaxial contexture 5. Shortly before the multiaxial contexture 5 enters into the calendering and separation unit 10, the multiaxial contexture is not yet solidified. After passing through the calendering- and separation unit 10, wherein the calendering- and separation unit 10 comprises two rollers 12 and 13, through which the multiaxial contexture 5 is pulled, the multiaxial contexture 5 is solidified. In the rollers 12 and 13, there are radial grooves 14, 15, 16 and 17, which receive the tension elements 6 and 7. As it is the case in the present embodiment, cutting blades can be disposed after the calendering behind the output of the two rollers 12 and 13, which blades separate the tension elements 6 and 7 from the multiaxial contexture after the exit from the calendering and separation unit 10 with one cut at the lateral edges. But it is also possible to remove the tension elements before calendering and to run the contexture into the calender without tension elements.

In the present embodiment of a winder 1, the tension elements 6 and 7 are then wound onto rollers 18 and 19, and in this depiction, the tension elements 6 and 7 are not fed back into the process. However, it is also possible to feed the tension elements 6 and 7 back into the process in a circle. The multiaxial contexture 5 becomes a multiaxial contexture 20 after calendering, which is then wound onto a roller 21. The rollers 8 and 9, the calendering and separation unit 10 and the rollers 18, 19 and 21 rotate synchronously, but it is also possible that the rollers 8, 9 the calendering- and separation unit 10 and the rollers 18, 19 and 21 are held stationary and the winding rollers 2 and 3 rotate about the axis of the winder 1, wherein the fiber material 4 from the winding rollers 2 and 3 is formed into the multiaxial contexture 5, wherein the multiaxial contexture 5 is continuously pulled downward by the force from the roller 21 and by the force from the rollers 12 and 13, and pulls the fiber material 4 from the winding rollers 2 and 3.

Figure 2:
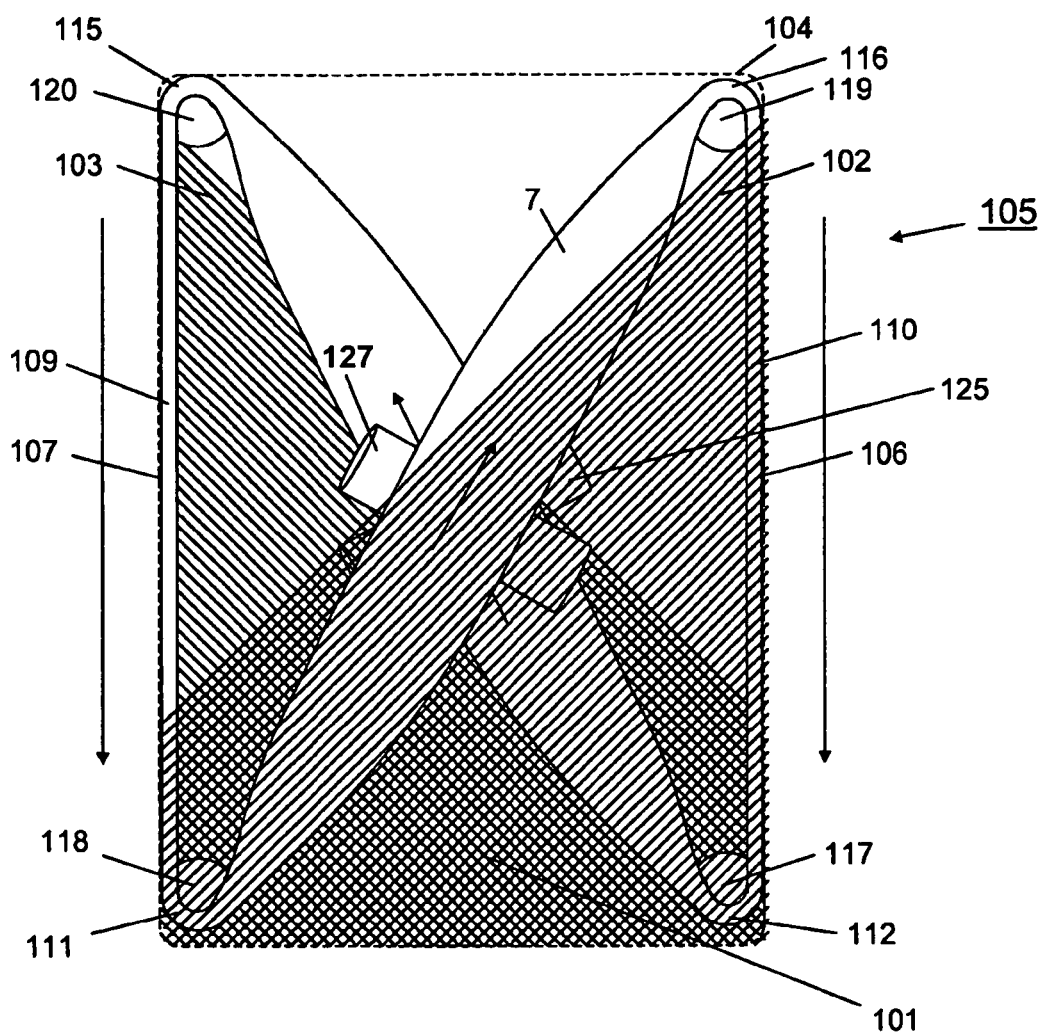
FIG. 2 shows a top view of a winding plane according to the invention.

It is illustrated in FIG. 2, how two webs of a monoaxial contexture 102 and 103 are wound about a winding plane 104 in order to produce a multiaxial contexture 101, wherein the winding plane 104 is substantially comprised of the belt drive 105. In the method according to the invention, the monoaxial contextures 102 and 103 are wound about the side edges 106 and 107 of a tautened belt 108. The belt 108, which is illustrated in more detail in FIG. 5, is thus tautened about four drive- and/or guide rollers 117-120 in a crossover assembly within the winding plane 104. Thus, the belt 108 forms protrusions 111-116 at the drive- and/or guide rollers 117-120. These protrusions 111-116 beyond the guide rollers 117-120 cause the monoaxial contexture 102 and 103 not to come in contact with moving parts during winding about the side edges 106 and 107 of the winding plane 104. The belt 108 extends starting in the upper left corner, namely where the protrusion 115 is provided at the roller 20, straight downward in a guide aligned perpendicular to the paper plane, namely to the location, where the protrusion 111 is provided at the roller 118. The roller 118 supports the belt 108 in vertical direction, however, the belt 108 is run rotated by 180° about the roller 119 in the right upper corner. During the transition from the roller 118 to the roller 119, the belt 108 performs a half counterclockwise rotation. This means that the belt edge 109 disposed above the paper plane is guided on the path from the roller 118 to the roller 119, towards the area below the paper plane, where said initially upper belt edge 109 is guided at the roller 119 to a lower belt edge 109, which is disposed below the paper plane. Simultaneously, the edge 110 disposed at the roller 118 below the paper plane is guided towards the area above the paper plane at roller 119, when transitioning from roller 118 to roller 119. In the path from the roller 119 to the roller 117, said belt edge 110 extends above the paper plane with a belt aligned perpendicular to the paper plane.

The rotation is repeated at roller 117 in reverse direction, thus clockwise, in the path to the roller 120, so that the belt edge 110 disposed between the roller 119 and 117 above the paper plane is guided to the area below the paper plane in the path from the roller 117 to the roller 120, and the belt edge 109 disposed at the roller 117 below the paper plane is guided to the area above the paper plane in the path from roller 117 to roller 120.

Figure 3:
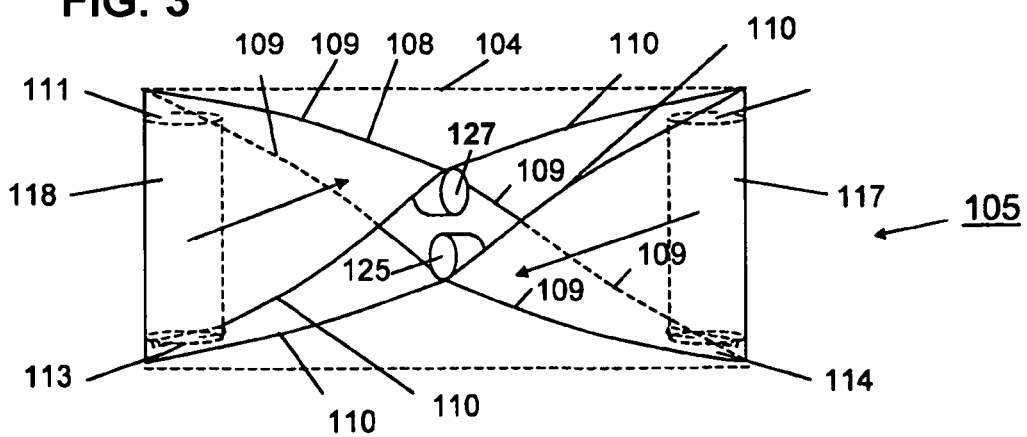
FIG. 3 shows a front view of a winding plane according to the invention.

The belt drive 105 with its belt 108 which is guided so it crosses over itself is illustrated in FIG. 3 in a frontal view. It is clearly visible in FIG. 3, how the belt 108 is disposed within the winding plane 104 between the rollers 117 and 118, which are visible in FIG. 3, so that the protrusions 111-114 do not cause the tautened carbon fibers to come in contact with moving parts. Furthermore, it can be derived from FIG. 3, how the belt edge 109, which is disposed in FIG. 2 on the left side of the figure above the paper plane, is guided by the crossover guide below the paper plane in the right portion of the depiction, and versa, the belt edge 110 is guided from below the paper plane in the right portion of FIGS. 2 and 3 in the path between roller 117 and the roller 120 disposed behind the paper plane towards the area above the paper plane. The belt 108 is configured as a cylindrical belt and does not comprise any twisting in itself.

Figure 4:
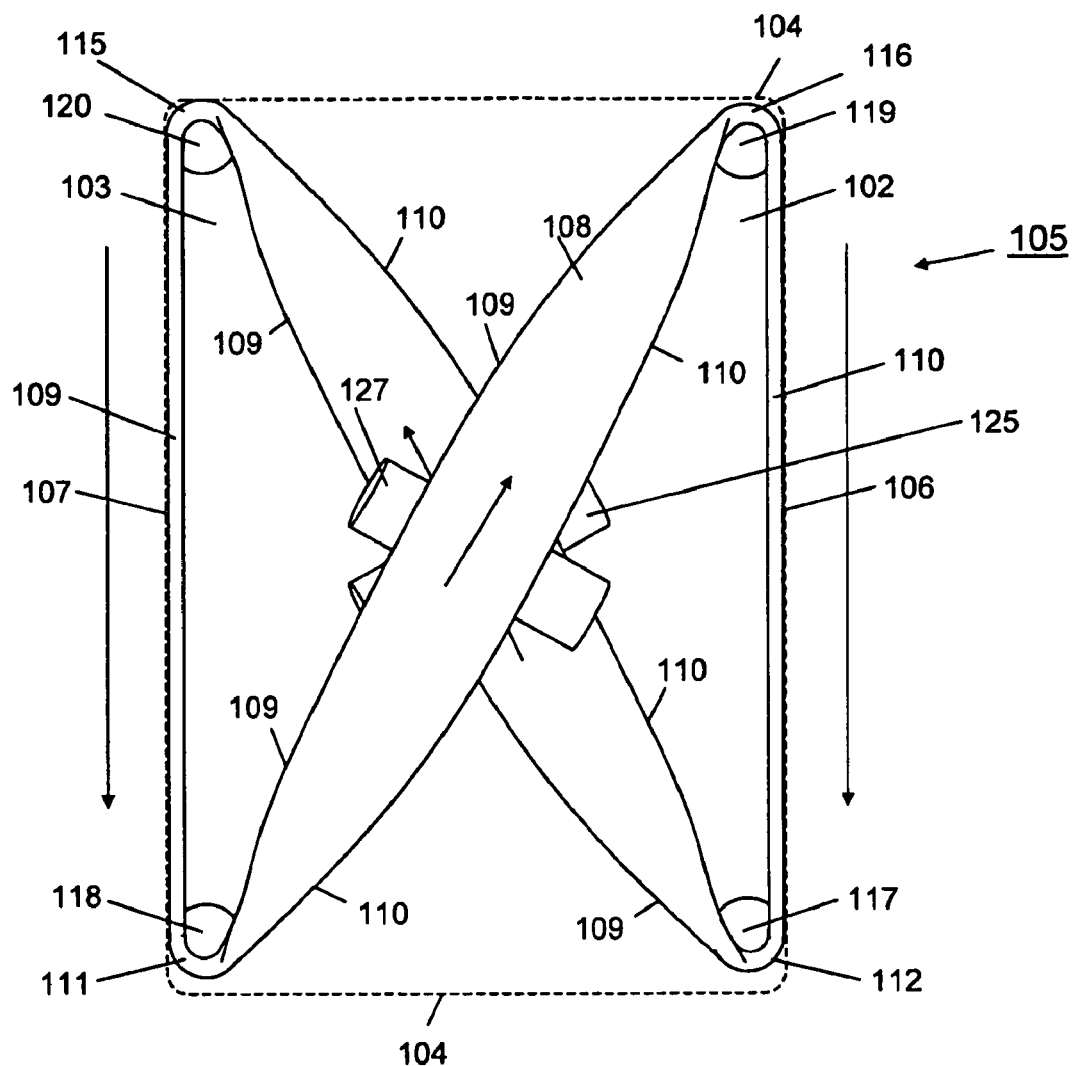
FIG. 4 shows a top view of the belt drive of FIG. 2.

In FIG. 4, the depiction of FIG. 2 is shown in more detail, wherein the delineation of the fibers was omitted in order to show the tension rollers 125 and 127, which protect the portions of the belt 108 crossing in front of one another from rubbing onto each other, since the tension rollers 125 and 127 are disposed between a crossover point of the belt 108 and guide the passing components 108 past one another at this location.

In FIGS. 5.1 and 5.2 an embodiment of a profile belt 121 is illustrated, which comprises plural profile ridges 122 on the drive side 123, which engage corresponding ring grooves of drive and/or guide rollers 117-120. It is provided on the outside 124 of the profile belt 121 in an advantageous embodiment of the present invention that grooves are provided, which are not drawn in FIG. 5, and which are disposed transversal to the drive direction of the profile belt 121, wherein the width of said grooves is adapted to the dimension of the width of a fiber. This creates an extremely fine transversal groove pattern, which leads to the particular fibers of the monoaxial contexture 102, which is wound about the profile belt 121, being retained by said grooves.

In FIG. 6, a pair of tension rollers is illustrated, which bracket a profile belt 121 illustrated in FIG. 5, on the drive side and also on the outside, thus tautening said profile belt. In FIGS. 2 and 3 only tension rollers 125 and 127 are drawn on the drive side, however, it is also possible to use additional tension rollers 130 disposed on the outside, instead of two tension rollers 125 and 127, which are only used on the drive side, where the profile of said tension rollers comprises a shape corresponding to the outside 124 of the belt 121.

Figure 7:
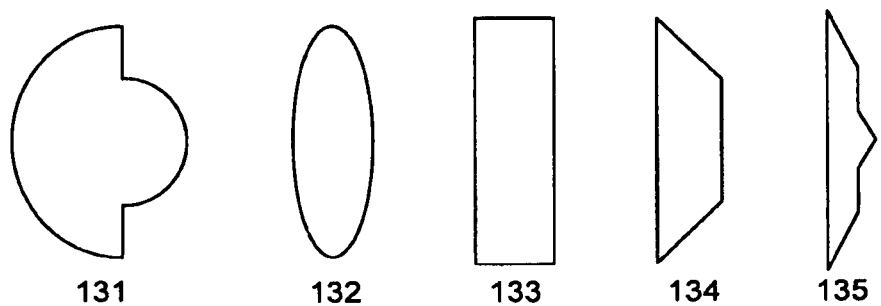
FIG. 7 shows belt profiles.

In FIG. 7, various belt profiles 131-135 are depicted, which can be used for the method according to the invention. Thus, this is a profile 131, made of two semi-round components with different size, a profile 132 with oval cross section, a profile 133 with rectangular cross section, a profile 134 with trapezoid cross section and a profile 135 with trapezoid cross section, which comprises a triangular ridge 136 towards the drive side.

Figure 8:
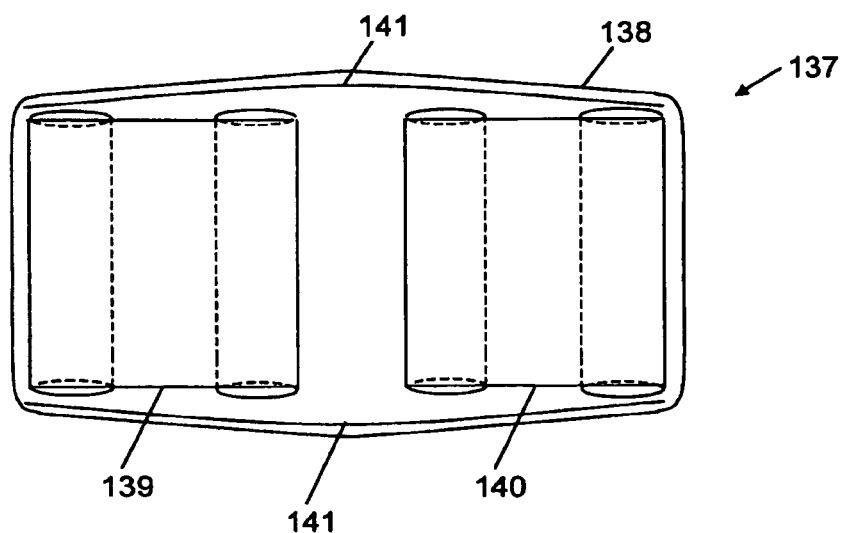
FIG. 8 shows a front view of another embodiment of a winding plane according to the invention.

In FIG. 8, it is illustrated in a front view, how a multiaxial contexture 138 is wound about a winding plane 137, which comprises convex surfaces 24 on the upper- and lower side of the winding plane 137. Hereby, the multiaxial contexture 138 is run about the rollers of belt- or band drives 139 and 140, so that the multiaxial contexture 138 does not come in direct contact with the belt- or band drives. Though, this means accepting that the multiaxial contexture is in frictional engagement with the convex surfaces, but hereby two simple belt- or band drives can be used, which do not require any crossover guide of the belt in the interior of the winding plane. Hereby, the configuration of the winding plane 137 is simplified, which makes the method according to the invention simpler to perform and makes the device according to the invention simpler to produce. Thus, it is necessary in the winding plane according to FIG. 8 to use two belt- or band drives, so that the driving at both sides or surfaces of the winding plane is oriented in the same direction.

Depending on the side edges of the winding plane or the upper- and lower side of the winding plane, having to be equipped by the belt- or band drive, the dimensions, in particular the width of the belt, or of the band, are selected. When the side surfaces of the winding plane are selected, a belt drive is enough to cover the side edges of the winding plane. When the upper- and lower side is equipped by the belt drive, it is necessary to resort to a broad band, in order to cover the broad surfaces of the winding plane.

Figure 9:
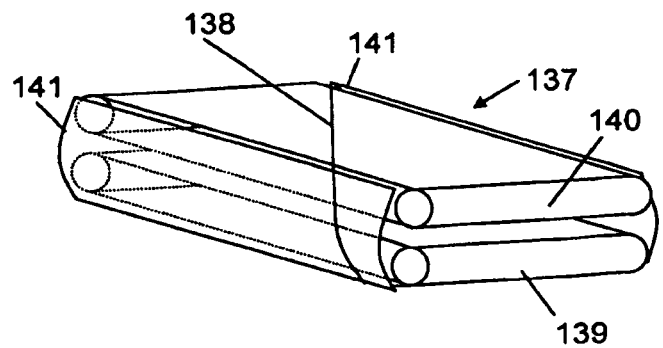
FIG. 9 shows a perspective view of another embodiment of a winding plane according to the invention.

FIG. 9 illustrates the winding plane 137 according to FIG. 8, wherein the dimensions are selected, so that the upper- and lower side of the winding plane are provided with a band drive. Through said winding plane 137, which comprises convex surfaces 24 at the side edges, a multiaxial contexture 138 can be produced, wherein the fibers of the contexture are guided on the large surfaces on the upper- and lower side of the winding plane 137. Like in FIG. 8, the particular fibers of the multiaxial contexture are moved by the band drives 139 and 140. In this embodiment it is possible, to run a third monoaxial contexture between the band drives 139 and 140 in order to produce a three layer multiaxial contexture.

Figure 10:
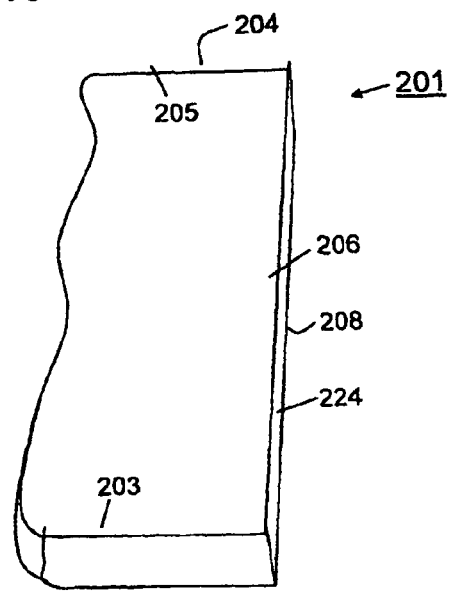
FIG. 10 shows the end of a prior art winding plate.

FIG. 10 illustrates the end of a plate 201, about which the monoaxial contextures are wound, in order to form a multiaxial contexture. The plate 201 thus comprises side surfaces 202 and 204, which form a cuboid body together with the upper side 206 and the bottom side 208 of the plate 201, about which cuboid body the monoaxial contextures are wound. In an ideal situation, the plate 201 should comprise an infinitely small plate thickness; however, in reality this is not possible. Thus, the plate 201 comprises a cross sectional surface 224, which comprises horizontal and vertical extensions. The plate 201 comprises lateral edges 203 and 205, where a coil, which is wound about the plate 201, forms winding edges, which cause the coil to be configured like a hose with a cross sectional surface, which approximately corresponds to the cross sectional surface 224.

Figure 11:
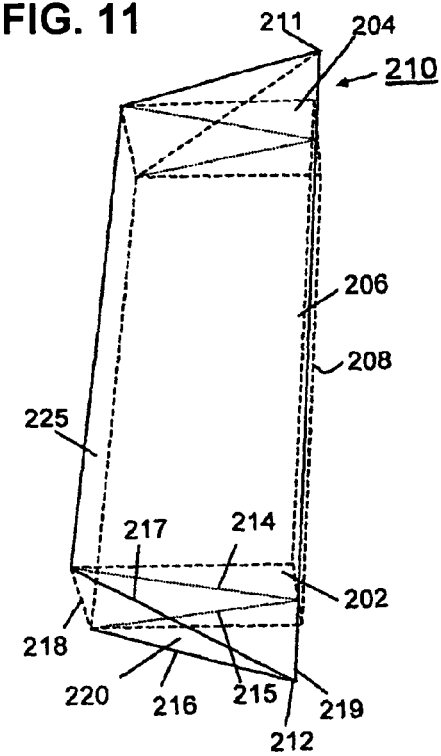
FIG. 11 shows the end of the winding plate according to FIG. 10 with a wedge according to the invention drawn superimposed.

The plate 201 is drawn as a cuboid in dashed lines in FIG. 11, which is configured by the lateral surfaces 202 and 204 and the upper side 206 and the lower side 208. In this body, a wedge 210 is drawn, which forms the inner section lines 214 and 215 with the body drawn in dashed lines, which corresponds to the plate 201. Relative to the width of the plate 201, the wedge 210 comprises lateral tetrahedroid points 211 and 212, which are comprised of one triangular surface 220 each, which are formed by the arms 216 and 217 and by the base 218. The wedge 210 in FIG. 11 is illustrated between the wedge 210 and the end piece of the plate 201 in order to emphasize the geometric relationship.

Figure 12:
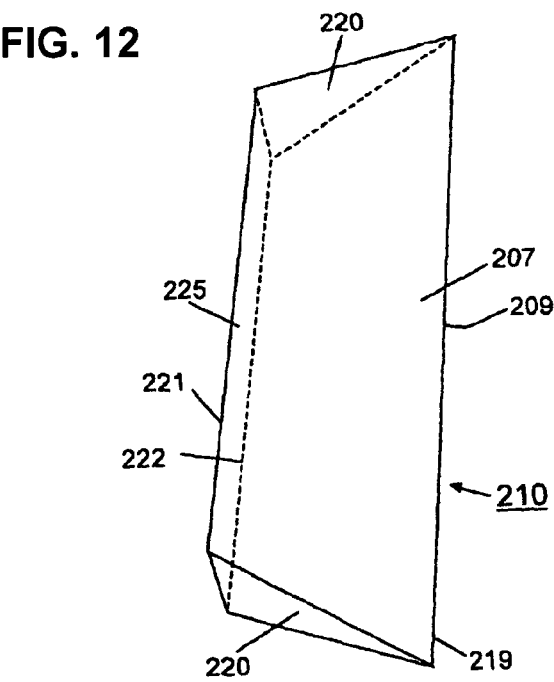
FIG. 12 shows the wedge of the cascade guide according to the invention.

In FIG. 12, the wedge 210 is illustrated by itself, which is defined by the trapezes 207 and 209, the base area 225, which is identical with the cross section area 224 of the plate 201, and by the triangular surfaces 220. The trapezes 207 and 209 comprise a base 218 and sides 221 and 222 disposed opposite to the base 219. The sides 221 and 222 thus have an extension like the width of the plate 201.

Figure 13:
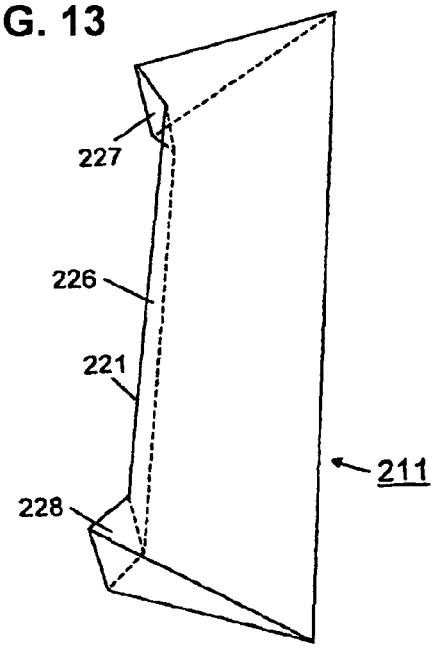
FIG. 13 shows the wedge of the cascade guide according to the invention with indentation.

In FIG. 13, the wedge 213 is illustrated with a recess 226, whose inner surface 223 is shortened relative to the sides 221 and 222 in FIG. 12. The recess 226 can thus receive mechanically moving components at the end of the winding table and the lateral wedges 227 and 228 reach around the mechanically moving components at the end of the winding table.

Figure 14:
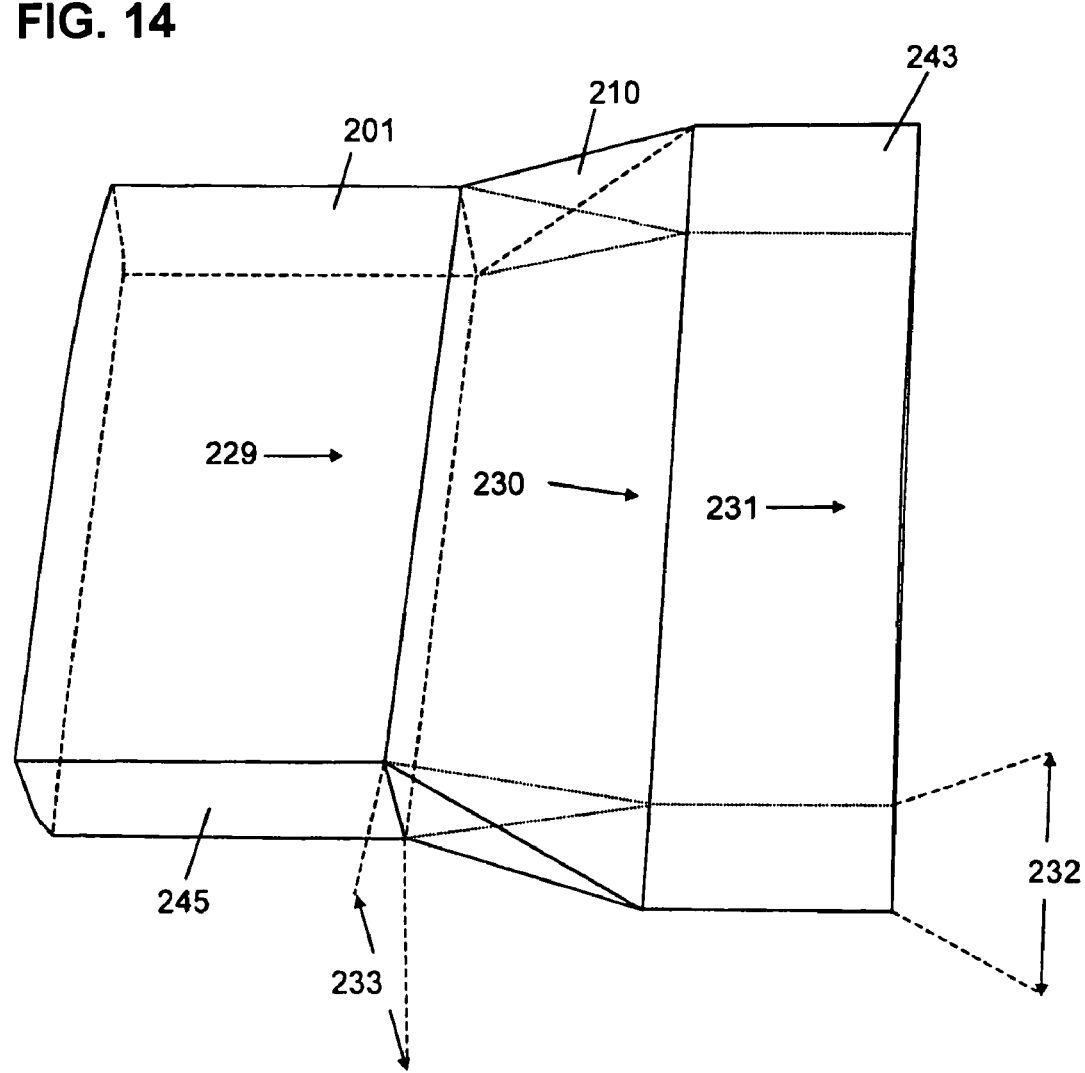
FIG. 14 shows the end of a winding plate with a wedge joined therewith and the transparently drawn coil being formed by this assembly.

In FIG. 14, the wedge 210 is illustrated in conjunction with the plate 201 as a coherent body, over which a transparently illustrated coil 245 is placed. The coil 245 is pulled off from the plate 201 in FIG. 4 from the left to the right and it is formed into a contexture 243 by the wedge 210. Thus, the movement direction 229 of the coil onto the wedge changes relative to the flow direction 230 and transitions into the flow direction 231 of the contexture 243. The entire width of the contexture 243 is thus widened by the thickness 233 of the plate 201. When forming the coil 245 into the contexture 243, two respectively folded tongues with the width 232, which corresponds to half the thickness 233 of the plate 201, are created at the sides of the contexture 243.

Figure 15:
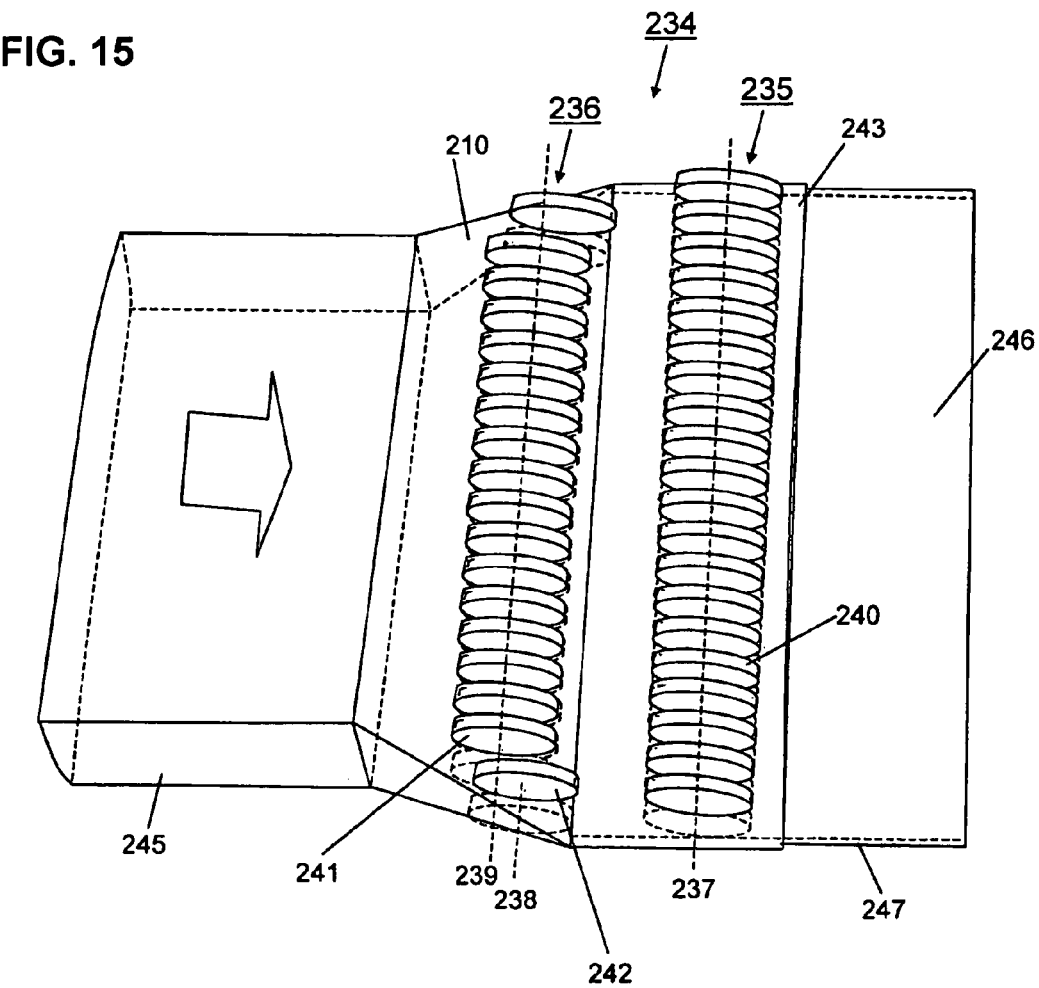
FIG. 15 shows the assembly of FIG. 14 with the rollers drawn therein.

In FIG. 15, the assembly of FIG. 14 is illustrated again, wherein, however, the cascade guide 234, comprised of the wedge 210 and the roller assemblies 235 and 236, is drawn. Besides the additionally drawn roller assemblies 235 and 236, a lug 245 with a bead 246 is drawn, over which the contexture 243 is run. The roller assemblies 235 and 236 comprise different axes 237, 238 and 239, wherein particular roller bodies 240, 241 and 242 are disposed on the axes 237 and 238. In FIG. 15, the roller bodies 240 on the axis 237 of the roller assembly 235 all comprise a common axis orientation. The particular roller bodies 240 are thus optionally each driven by themselves, so that they neither brake nor drive the contexture 243 but press the contexture 243 onto the lug 246 without force with reference to the drive direction. In the roller assembly 236, two additional axes 238 and 239 are drawn, wherein the roller body 242 can comprise a slightly different orientation with reference to the axis 239 as well as a slightly different velocity than the particular roller bodies 241 on the axle 239.

Figure 16:
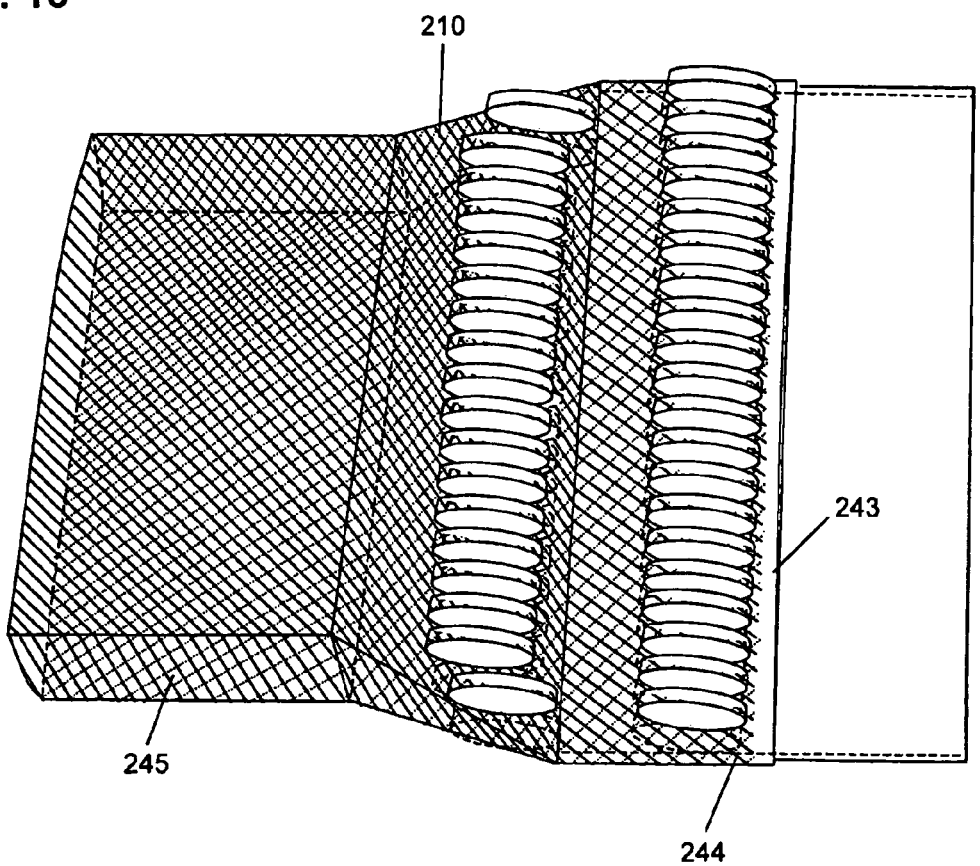
FIG. 16 shows the assembly of FIG. 15 with a coil drawn therein.

FIG. 16 shows an assembly comparable to FIG. 15, wherein the particular fibers 244 are illustrated additionally, which form the coil 245 and the contexture 243. The function of the cascade guide in FIG. 16 is thus identical to the function of the cascade guide in FIG. 15, wherein the contexture is illustrated here in a pronounced manner, which shows how the coil 245 is formed into the contexture 243 by the wedge 210.

Figure 17:
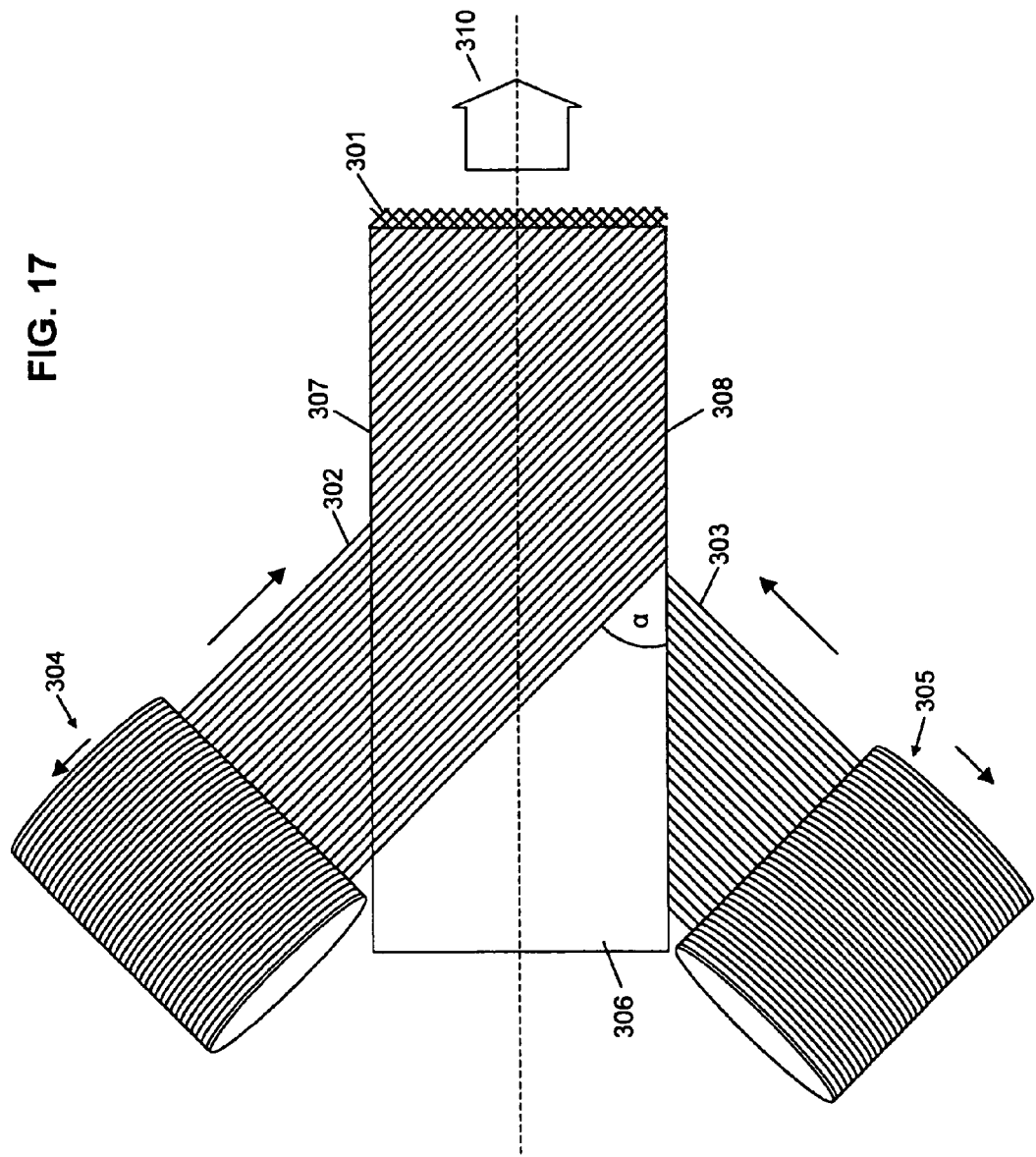
FIG. 17 shows a sketched illustration of a device for performing the method according to the invention.

FIG. 17 shows a sketch of a device in which a multiaxial contexture 301 made of two monoaxial contextures 302 and 303 is created. From two storage devices 304 or 305, which are provided here in the form of rollers, the monoaxial contextures 302 and 303 are wound about a winding plane 306 at an angle α, wherein the angle α is defined by the side edges 307 and 308 of the winding plane 306 and by the orientation of the fibers of the monoaxial contextures 302 and 303. In the method according to the invention, the two storage devices 304 and 305 rotate about the winding plane 306 or the winding plane 306 rotates without the two storage devices 304 and 305 changing their positions. During the winding process, the multiaxial contexture 301 is pulled off from the winding plane 306 in pull off direction 310, so that the multiaxial contexture 301 is formed from the two monoaxial contextures 302 and 303 in a continuous process. When the winding plane 306 is induced to oscillate mechanically, the contexture on the winding plane 306 comprises a very small resistance and when the vibration comprises a preferred direction, the contexture is transported in the pull off direction 310 through the vibration in the preferred direction, so that pulling the multiaxial contexture off by another device is not necessary.

Figure 18:
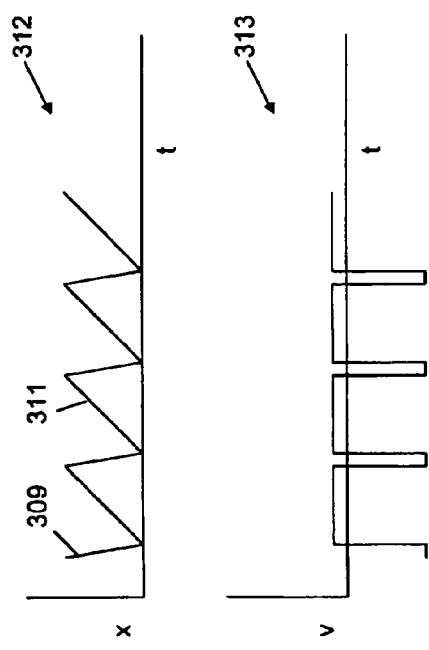
FIG. 18 shows a time-distance-diagram and a velocity diagram of an oscillation.

FIG. 18 illustrates a time-distance-diagram 312 and a velocity diagram 313 corresponding thereto of a vibration with preferred directions. The time-distance-diagram 312 depicts the location as a function of time during a vibration. Thus, the time distance diagram comprises a short flank 309 and a long flank 311. The short flank 309 indicates a fast reversal movement; on the other hand, the less steep flank 311 indicates a slower forward movement. The two movements in the velocity diagram 313 are illustrated corresponding to the time-distance-diagram 312. A negative velocity is depicted in the velocity diagram, where the steeper flank 309 is disposed, and a lower but positive velocity is depicted in the speed diagram, where the less steep flank 311 is disposed. The time-distance-diagram thus comprises a saw tooth character, in which the flanks 309 and 311 show the form of saw teeth through their different slopes.

Figure 19:
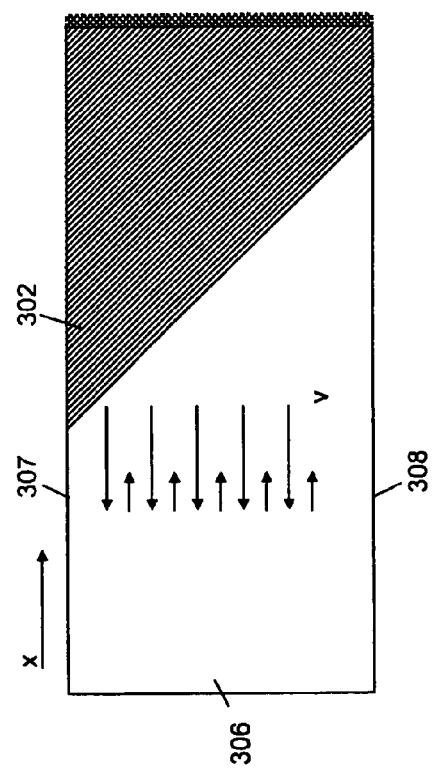
FIG. 19 shows a partially circumwound winding plane with velocity vectors of the oscillations depicted.

In FIG. 19, the winding plane 306 is illustrated with partially circumwound monoaxial fibers 302, wherein the winding plane 306 illustrated in FIG. 19 performs vibrations parallel to the side edges 307 and 308. The vibrations are illustrated in FIG. 19 by longer arrows against the pull off direction to the left and by shorter arrows in the pull off direction to the right. A longer arrow thus represents a higher velocity and a shorter arrow thus represents a lower velocity. Through the sequence of higher velocity to the left and lower velocity to the right, the fibers of the monoaxial contexture 302 alternate between static and dynamic friction, wherein the fibers remain on the winding plane 306 through the static friction at lower velocity and are thus transported to the right and transit into dynamic friction at a higher velocity against the pull off direction 310 to the left and thus do not follow a reversal movement of the winding plane. This way, the particular fibers of the monoaxial contexture 302 are slowly transported to the right in pull off direction 310.

Figure 20:
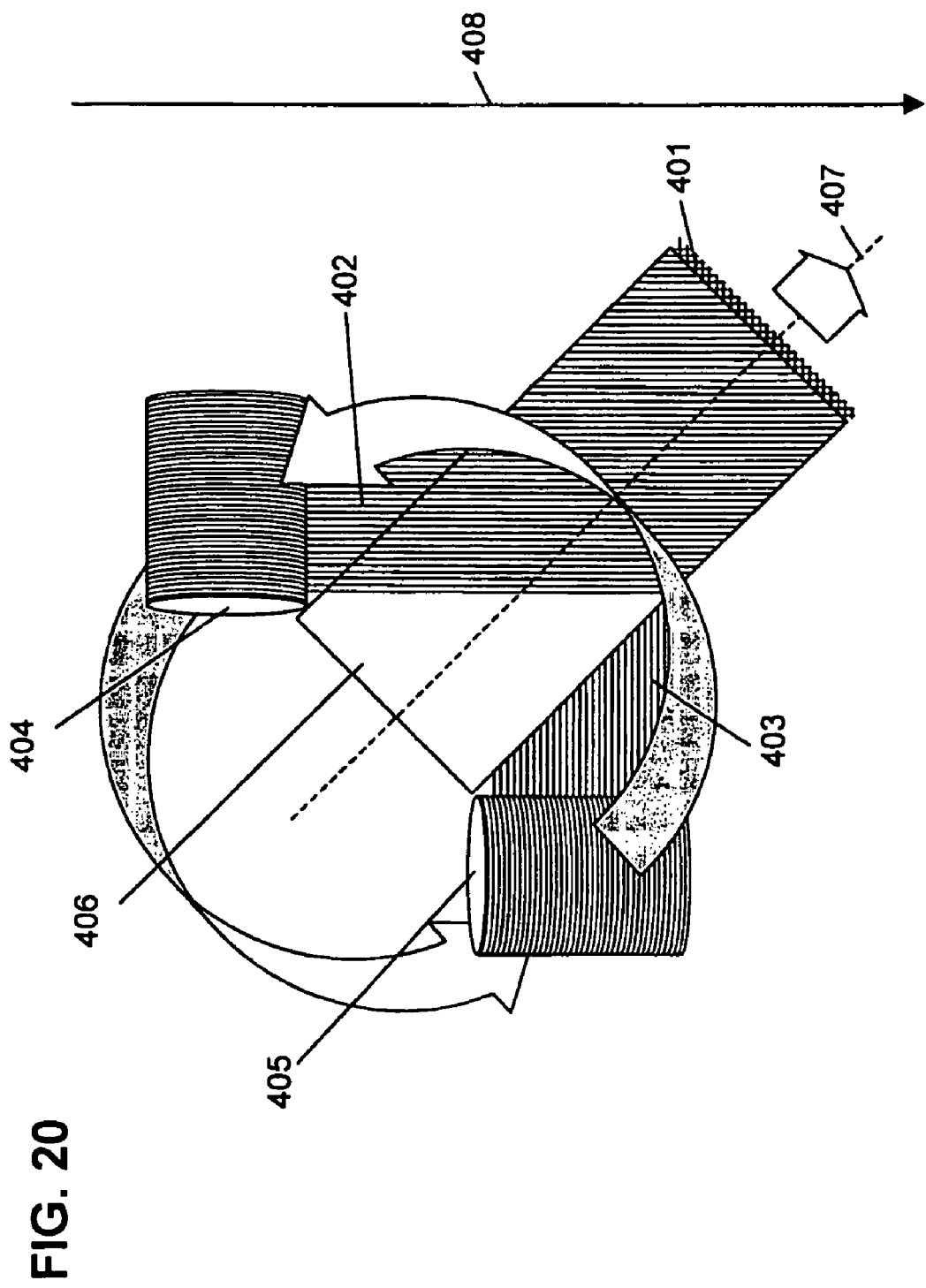
FIG. 20 shows a sketch illustrating the method according to the invention and the device for performing the method according to the invention.

FIG. 20 shows a sketch illustrating the method for producing a multiaxial contexture 401, in which a multiaxial contexture 402 and 403 from at least one storage device 404 and 405 is wound about a winding plane 406. The winding plane 406 and the two storage devices 404 and 405 rotate about one another. According to the invention, it is provided that the storage devices 404 and 405 rotate about the winding plane 406. However, it is also possible that the storage devices 404 and 405 are held stationary, and the winding plane 406 rotates about its particular longitudinal axis 407. Besides that, it is also possible that a combined movement of the winding plane 406 and the two storage devices 404 and 405 is provided. During the relative rotation of the storage devices 404 and 405 and the winding plane 406, the monoaxial contexture 402 and 403 is placed on one respective side of the winding plane 406, wherein the monoaxial contexture 402 and 403 uniformly slides off the winding plane 406 through the slanted orientation of the longitudinal axis 407 with respect to the direction of gravity 408, and thus the multiaxial contexture 401 can be pulled off from the winding plane 406 without the fibers of the monoaxial contexture 402 and 403 wedging at the winding plane 406 through static friction, and thus cannot be pulled off to form a uniform multiaxial contexture 401.

The above described embodiments are descriptive and do not limit the scope of the invention, which is defined by the appended patent claims.

REFERENCE NUMERALS AND DESIGNATIONS 1 winder
2 winding roller
3 winding roller
4 fiber material
5 multiaxial contexture
6 tension element
7 tension element
8 roller
9 roller
10 calendering- and separation unit
11 windup unit
12 roller
13 roller
14 groove
15 groove
16 groove
17 groove
18 roller
19 roller
20 contexture
21 roller
101 multiaxial contexture
102 monoaxial contexture
103 monoaxial contexture
104 winding plane
105 belt drive
106 side edge
107 side edge
108 belt
109 belt edge
110 belt edge
111 protrusion
112 protrusion
113 protrusion
114 protrusion
115 protrusion
116 protrusion
117 drive-/guide roller
118 drive-/guide roller
119 drive-/guide roller
120 drive-/guide roller
121 profile belt
122 profile ridge
123 drive side
124 outside
125 tension roller
126 tension roller
127 tension roller
128 tension roller
129 ring groove
130 tension roller
131 belt profile
132 belt profile
133 belt profile
134 belt profile
135 belt profile
136 ridge
137 winding plane
138 multiaxial contexture
139 belt drive
140 belt drive
141 convex surface
201 plate
202 side surface
203 edge
204 side surface
205 edge
206 upper side
207 trapeze
208 lower side
209 trapeze
210 wedge
211 point
212 point
213 wedge
214 section line
215 section line
216 arm
217 arm
218 base (triangle)
219 base (trapeze)
220 triangular area
221 side
222 side
223 area
224 cross sectional area
225 base area
226 indentation
227 wedge
228 wedge
229 driving direction
230 flow direction
231 flow direction
232 width
233 thickness
234 cascade guide
235 roller assembly
236 roller assembly
237 axis
238 axis
239 axis
240 roller body
241 roller body
242 roller body
243 contexture
244 fiber
245 coil
246 lug 247 bead
301 multiaxial contexture
302 monoaxial contexture
303 monoaxial contexture
304 storage device
305 storage device
306 winding plane
307 side edge
308 side edge
309 short flank
310 pull off direction
311 long flank
312 time-distance-diagram
313 velocity diagram
401 contexture
402 monoaxial contexture
403 monoaxial contexture
404 storage device
405 storage device
406 winding plane
407 longitudinal axis
408 direction of gravity

What is claimed is:

1. A method for producing a multiaxial contexture from fiber materials, comprising the following steps:
    winding a mono-axial contexture that is wound from at least one storage device about a winding plane,
       wherein the winding plane and the at least one storage device rotate about one another in order to wind the mono-axial contexture about the winding plane, and
       wherein a vibration drive imparts predetermined mechanical oscillations that are controlled with respect to oscillation frequency and amplitude onto the winding plane; and
    driving the fibers of the multiaxial contexture on the winding plane with a forward drive velocity through the vibration drive.

2. The method according to claim 1, wherein the vibration drive generates mechanical oscillations with substantially saw tooth character in a time-distance-diagram, wherein a steeper flank of the mechanical oscillations is oriented against the pull off direction of the contexture and a less steep flank of the mechanical oscillations is oriented in the pull off direction of the contexture.

3. The method according to claim 1, wherein a surface on the winding plane in conjunction with the fibers of the mono-axial contexture to be wound generates a defined friction resistance for the fibers of the contexture on the winding plane through fine structuring.

4. The method according to claim 1, wherein the forward drive velocity of the fibers of the multiaxial contexture on the winding plane through the vibration drive is synchronized with a relative rotation velocity of the storage devices about the winding plane, wherein the contexture is driven forward with reference to the winding plane by a tangent of a winding angle, which is measured between an orientation of side edges of the winding plane and an orientation of the fibers of the mono-axial contexture, multiplied by a width of the winding plane, wherein the forward driving is performed during a time of a half rotation of the storage devices.

5. The method according to claim 4, further comprising a variation of the forward drive velocity through the vibration drive during the relative rotation of the at least one storage device about the winding plane, wherein the drive velocity is adapted to the tangent of the winding angle, which is measured between the orientation of the side edges of the winding plane, multiplied by the width of the winding plane per quarter rotation of the winding plane, when the fibers of the mono-axial contexture are tightened by a side edge of the winding plane and wound onto a surface of the winding plane, and the drive velocity is adapted to the tangent of the winding angle, which is measured between the orientation of the side edges of the winding plane, multiplied by the thickness of the winding plane per quarter rotation of the winding plane, when the fibers of the mono-axial contexture are tightened by a side edge of the winding plane and wound onto a side edge of the winding plane.

6. The method according to claim 1, wherein the oscillation frequency is 1 Hz to 500 Hz.

7. The method according to claim 1, wherein the amplitude of the oscillation of 0.001 cm to 10 cm.

8. A device for producing a multiaxial contexture, made of fibers, comprising at least one storage device for a mono-axial contexture and a winding plane, wherein the at least one storage device and the winding plane rotate about one another, thus winding the mono-axial contexture from the at least one storage device about the winding plane, wherein a vibration drive imparts predetermined mechanical oscillations that are controlled with respect to oscillation frequency and amplitude upon the winding plane in parallel to an orientation of side edges of the winding plane, wherein the vibration drive drives the fibers of the multiaxial contexture on the winding plane with a forward drive velocity.

9. The device according to claim 8, wherein the vibration drive generates mechanical oscillations with substantially saw tooth character in a time-distance-diagram, wherein a the steeper flank of the mechanical oscillations is oriented against the pull off direction of the contexture and a less steep flank of the mechanical oscillations is oriented in the pull off direction of the contexture.

10. The device according to claim 8, wherein a surface on the winding plane in conjunction with the fibers of the mono-axial contexture to be wound generates a defined friction resistance for the fibers on the winding plane through fine structuring.

11. The device according to claim 8, wherein the forward drive velocity of the fibers is synchronized through the vibration drive with a relative rotation velocity of the storage devices about the winding plane, wherein the forward drive velocity is selected, so that the contexture is driven forward by a tangent of a winding angle, which is measured between an orientation of the side edges of the winding plane and an orientation of the fibers of the monoaxial contexture, multiplied by a width of the winding plane, wherein the forward driving is performed during a time of a half rotation of the storage devices with respect to the winding plane.

12. The device according to claim 11, wherein a variation of the forward drive velocity is provided during a relative rotation of the at least one storage device about the winding plane, wherein the drive velocity is adapted to the tangent of the winding angle, which is measured between the orientation of the side edges of the winding plane and the orientation of the fibers of the monoaxial contexture, multiplied by the width of the winding plane per quarter rotation of the winding plane, when the fibers of the mono-axial contexture are tightened by a side edge of the winding plane and wound onto a surface of the winding plane, and the drive velocity is adapted to the tangent of the winding angle, which is measured between the orientation of the side edges of the winding plane, multiplied by the thickness of the winding plane per quarter rotation of the winding plane, when the fibers of the mono-axial contexture are tightened by a side edge of the winding plane and wound onto a side edge of the winding plane.

13. The device according to claim 8, wherein the oscillation frequency is 1 Hz to 500 Hz.

14. The device according to claim 8, wherein the amplitude of the oscillation is 0.001 cm to 10 cm.

15. A method for producing a multiaxial contexture from fiber materials, comprising the following steps:
    winding a mono-axial contexture that is wound from at least one storage device about a winding plane; and
    driving the fibers of the multiaxial contexture on the winding plane with a forward drive velocity through the vibration drive,
        wherein the winding plane and the at least one storage device rotate about one another in order to wind the mono-axial contexture about the winding plane;
        wherein a vibration drive imparts predetermined mechanical oscillations that are controlled with respect to oscillation frequency and amplitude onto the winding plane;
        wherein the forward drive velocity of the fibers of the multiaxial contexture on the winding plane through the vibration drive is synchronized with a relative rotation velocity of the storage devices about the winding plane;
        wherein the contexture is driven forward with reference to the winding plane by a tangent of a winding angle, which is measured between an orientation of side edges of the winding plane and an orientation of the fibers of the mono-axial contexture, multiplied by a width of the winding plane;
        wherein the forward driving is performed during a time of a half rotation of the storage device;
        wherein the forward drive velocity through the vibration drive is varied during the relative rotation of the at least one storage device about the winding plane, and
        wherein the drive velocity is adapted to the tangent of the winding angle, which is measured between the orientation of the side edges of the winding plane, multiplied by the width of the winding plane per quarter rotation of the winding plane, when the fibers of the mono-axial contexture are tightened by a side edge of the winding plane and wound onto a surface of the winding plane, and the drive velocity is adapted to the tangent of the winding angle, which is measured between the orientation of the side edges of the winding plane, multiplied by the thickness of the winding plane per quarter rotation of the winding plane, when the fibers of the mono-axial contexture are tightened by a side edge of the winding plane and wound onto a side edge of the winding plane.

\* \* \* \* \*